United States Patent
Hirao

(10) Patent No.: US 12,263,709 B2
(45) Date of Patent: Apr. 1, 2025

(54) VEHICLE SUSPENSION CONTROL DEVICE INCLUDING A DAMPING FORCE ADJUSTABLE SHOCK ABSORBER

(71) Applicant: Hitachi Astemo, Ltd., Ibaraki (JP)

(72) Inventor: Ryusuke Hirao, Kamagaya (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 804 days.

(21) Appl. No.: 17/277,440

(22) PCT Filed: Sep. 18, 2019

(86) PCT No.: PCT/JP2019/036498
§ 371 (c)(1),
(2) Date: Mar. 18, 2021

(87) PCT Pub. No.: WO2020/075455
PCT Pub. Date: Apr. 16, 2020

(65) Prior Publication Data
US 2021/0354523 A1    Nov. 18, 2021

(30) Foreign Application Priority Data
Oct. 12, 2018   (JP) .................................. 2018-193609

(51) Int. Cl.
*B60G 17/0165*       (2006.01)
*B60G 17/015*        (2006.01)

(52) U.S. Cl.
CPC ..... *B60G 17/0165* (2013.01); *B60G 17/0152* (2013.01); *B60G 2202/24* (2013.01);
(Continued)

(58) Field of Classification Search
CPC ............ B60G 17/0165; B60G 17/0152; B60G 17/015; B60G 17/06; B60G 17/08;
(Continued)

(56) References Cited

U.S. PATENT DOCUMENTS 4,647,068 A  *  3/1987  Asami ................ B60G 17/0165
                                                    280/5.517
5,015,007 A  *  5/1991  Uchiyama ............ B60G 17/015
                                                    280/5.514
(Continued)

FOREIGN PATENT DOCUMENTS

DE    10 2008 053 007       10/2009
DE    10 2009 053 277        6/2011
(Continued)

OTHER PUBLICATIONS

Engine Boring and Engine Stroking Fundamentals, Dec. 1, 1998, MotorTrend, pp. 1-13.*
(Continued)

*Primary Examiner* — Andrew R Dyer
(74) *Attorney, Agent, or Firm* — Wenderoth, Lind & Ponack, L.L.P.

(57) ABSTRACT

A controller executes full extension suppression control or full compression suppression control of adjusting a damping force to be large when a piston being displaced through sliding in an inner tube approaches a full extension position or a full compression position. Moreover, a stroke from a neutral position of the piston in the inner tube to a full compression control start position is set so as to be longer than a stroke from the neutral position of the piston to a full extension control start position. A portion between the full extension control start position to the full compression control start position is set to a dead zone in which none of the full extension suppression control and the full compression suppression control are executed.

7 Claims, 10 Drawing Sheets

(52) U.S. Cl.
CPC .. *B60G 2400/202* (2013.01); *B60G 2400/252* (2013.01); *B60G 2400/821* (2013.01); *B60G 2500/10* (2013.01)

(58) Field of Classification Search
CPC .......... B60G 2202/24; B60G 2400/202; B60G 2400/252; B60G 2400/821; B60G 2400/20; B60G 2400/82; B60G 2500/10; B60G 2600/12; F16F 9/48; F16F 9/46; F16F 15/02; B60Y 2400/301
USPC .......................................................... 701/37
See application file for complete search history.

(56) References Cited

U.S. PATENT DOCUMENTS

| | | | | |
|---|---|---|---|---|
| 5,398,184 A * | 3/1995 | Yamaoka | ............. | B60G 17/018 280/5.507 |
| 5,425,436 A * | 6/1995 | Teramura | ............. | B60G 17/018 280/5.515 |
| 5,490,068 A * | 2/1996 | Shimizu | ................ | B60G 17/08 280/5.515 |
| 5,559,700 A * | 9/1996 | Majeed | ................ | B60G 17/018 280/5.515 |
| 5,649,611 A * | 7/1997 | Nakadate | ................... | F16F 9/46 188/266.6 |
| 5,657,840 A * | 8/1997 | Lizell | .................. | B60G 17/018 188/266.5 |
| 5,718,446 A * | 2/1998 | Fuchida | ............. | B60G 17/0164 280/5.513 |
| 5,779,009 A * | 7/1998 | Iwasaki | ............... | B60G 99/002 701/37 |
| 5,802,486 A * | 9/1998 | Uchiyama | ............... | F16F 9/467 280/5.52 |
| 5,839,082 A * | 11/1998 | Iwasaki | ............... | B60G 17/015 280/5.507 |
| 5,944,763 A * | 8/1999 | Iwasaki | ............... | B60G 17/0165 701/37 |
| 5,950,776 A * | 9/1999 | Iwasaki | .................. | F16F 9/468 137/599.17 |
| 5,983,150 A * | 11/1999 | Sasaki | .................. | F16F 9/3482 701/38 |
| 5,988,655 A * | 11/1999 | Sakai | ...................... | F16F 9/512 280/124.159 |
| 6,017,044 A * | 1/2000 | Kawagoe | .................. | F16F 9/54 280/124.145 |
| 6,026,939 A * | 2/2000 | Girvin | ................. | B62K 25/286 280/275 |
| 6,067,491 A * | 5/2000 | Takahashi | .......... | B62D 33/0608 296/190.01 |
| 6,073,066 A * | 6/2000 | Takahashi | ............... | B60G 17/08 180/89.12 |
| 6,086,060 A * | 7/2000 | Berthold | ............ | B60G 17/0424 267/64.15 |
| 6,244,398 B1 * | 6/2001 | Girvin | ............. | B60G 17/01941 188/316 |
| 6,247,683 B1 * | 6/2001 | Hayakawa | ................ | F16F 9/06 267/64.11 |
| 6,295,493 B1 * | 9/2001 | Kawazoe | .......... | B60G 17/0162 280/5.506 |
| 6,332,622 B1 * | 12/2001 | Nakamura | ............. | F16F 9/464 188/266.5 |
| 6,340,081 B1 * | 1/2002 | Keil | ........................ | F16F 9/348 188/322.22 |
| 6,434,460 B1 * | 8/2002 | Uchino | ............ | B60G 17/01933 180/902 |
| 6,556,907 B1 * | 4/2003 | Sakai | .................. | B60G 17/056 280/124.1 |
| 6,671,596 B2 * | 12/2003 | Kawashima | ........... | B60G 7/006 280/5.515 |
| 6,793,049 B2 * | 9/2004 | Kazmirski | ............. | F16F 9/504 188/315 |
| 7,416,189 B2 * | 8/2008 | Wilde | ................ | B60G 17/0165 280/124.16 |
| 8,086,371 B2 * | 12/2011 | Furuichi | ............... | B60G 17/016 701/37 |
| 8,165,749 B2 * | 4/2012 | Izawa | ................ | B60G 17/0152 280/5.506 |
| 8,210,330 B2 * | 7/2012 | Vandewal | .......... | B60G 17/0152 188/282.1 |
| 8,701,846 B2 * | 4/2014 | Reybrouck | ............... | F16F 9/49 280/276 |
| 8,820,494 B2 * | 9/2014 | Nagai | ...................... | F16F 9/36 188/315 |
| 8,935,047 B2 * | 1/2015 | Sekiya | ................... | B60G 17/08 701/37 |
| 9,211,875 B2 * | 12/2015 | Harada | ................ | B60T 8/4031 |
| 9,340,088 B2 * | 5/2016 | Otake | ................ | B60G 17/0162 |
| 9,340,211 B1 * | 5/2016 | Singh | .................... | B60T 8/1725 |
| 9,546,707 B2 * | 1/2017 | Kus | ........................ | F16F 9/48 |
| 9,682,602 B2 * | 6/2017 | Morita | ................. | B60G 17/015 |
| 9,719,573 B2 * | 8/2017 | Noguchi | .................... | F16F 9/44 |
| 10,040,329 B2 * | 8/2018 | Ericksen | ................ | B60G 17/015 |
| 10,703,161 B2 * | 7/2020 | Nedachi | .......... | B60G 17/0195 |
| 10,821,795 B2 * | 11/2020 | Ericksen | ................ | B60G 17/018 |
| 11,124,036 B2 * | 9/2021 | Brady | ................ | B60G 17/019 |
| 2001/0042663 A1 * | 11/2001 | Marking | ............. | F16F 9/0209 188/266 |
| 2002/0045977 A1 * | 4/2002 | Uchiyama | ........ | B60G 17/01908 280/5.515 |
| 2003/0204293 A1 * | 10/2003 | Shiino | ................ | B60G 17/0162 280/5.502 |
| 2005/0113997 A1 * | 5/2005 | Kim | .................. | B60G 17/0165 280/5.515 |
| 2005/0113998 A1 * | 5/2005 | Kim | ..................... | B60G 17/018 701/37 |
| 2005/0127587 A1 * | 6/2005 | Nagai | ....................... | F16F 9/36 267/266 |
| 2005/0178628 A1 * | 8/2005 | Uchino | ................ | B60G 17/016 188/379 |
| 2006/0283675 A1 * | 12/2006 | Teraoka | .................. | F16F 9/5126 188/298 |
| 2007/0144845 A1 * | 6/2007 | Saito | ....................... | B62K 25/08 280/276 |
| 2007/0144848 A1 * | 6/2007 | Saito | ........................ | F16F 9/061 188/314 |
| 2008/0140285 A1 * | 6/2008 | Sekiya | .................... | B60G 17/018 701/38 |
| 2008/0250844 A1 * | 10/2008 | Gartner | ................... | F16F 9/3264 73/11.07 |
| 2009/0001637 A1 * | 1/2009 | Murakami | ............ | F16F 13/007 267/118 |
| 2009/0085309 A1 * | 4/2009 | Hirao | ................... | B60G 17/015 280/5.503 |
| 2009/0132122 A1 * | 5/2009 | Kim | ........................ | B60G 17/06 188/322.19 |
| 2010/0044975 A1 * | 2/2010 | Yablon | ................... | B60G 17/08 188/282.8 |
| 2011/0083930 A1 * | 4/2011 | Laird | .................... | F16F 13/002 188/314 |
| 2011/0127127 A1 * | 6/2011 | Hirao | ..................... | B60G 17/08 188/266.2 |
| 2011/0241299 A1 * | 10/2011 | Harada | ..................... | B60G 17/08 280/5.513 |
| 2012/0018263 A1 * | 1/2012 | Marking | ................ | F16F 9/065 188/266.2 |
| 2012/0247888 A1 * | 10/2012 | Chikuma | ............... | B60G 17/08 701/38 |
| 2012/0248670 A1 * | 10/2012 | Yamashita | ................ | F16F 9/49 267/226 |
| 2012/0305347 A1 * | 12/2012 | Mori | ...................... | B60G 17/08 188/266.2 |
| 2013/0079988 A1 * | 3/2013 | Hirao | .................. | B60W 10/184 701/38 |
| 2013/0087421 A1 * | 4/2013 | Iwami | .................. | B60G 11/265 188/266.2 |
| 2013/0144489 A1 * | 6/2013 | Galasso | ............. | B60G 17/0424 701/37 |

(56) References Cited

U.S. PATENT DOCUMENTS

| | | | |
|---|---|---|---|
| 2013/0245889 A1* | 9/2013 | Kikuchi | B60T 8/17555 |
| | | | 701/38 |
| 2013/0253764 A1* | 9/2013 | Kikuchi | B60G 17/016 |
| | | | 701/38 |
| 2013/0275003 A1* | 10/2013 | Uchino | B60G 17/06 |
| | | | 701/40 |
| 2014/0232082 A1* | 8/2014 | Oshita | B60G 17/0162 |
| | | | 280/124.161 |
| 2014/0316652 A1* | 10/2014 | Ericksen | F16F 9/512 |
| | | | 701/37 |
| 2015/0032332 A1* | 1/2015 | Kikuchi | B60W 30/025 |
| | | | 701/37 |
| 2015/0088379 A1 | 3/2015 | Hirao | |
| 2015/0233442 A1* | 8/2015 | Noguchi | F16F 9/06 |
| | | | 188/284 |
| 2015/0259028 A1* | 9/2015 | Ishikawa | B62K 25/08 |
| | | | 280/6.152 |
| 2016/0031284 A1* | 2/2016 | Yamashita | F16F 9/465 |
| | | | 188/266 |
| 2016/0288605 A1* | 10/2016 | Teraoka | B60G 13/08 |
| 2017/0174034 A1* | 6/2017 | Liu | B60G 17/08 |
| 2017/0274724 A1* | 9/2017 | Liu | B60G 17/01933 |
| 2017/0284495 A1* | 10/2017 | Matsumoto | F16F 9/3257 |
| 2018/0134111 A1* | 5/2018 | Toyohira | B60G 17/021 |
| 2020/0023704 A1* | 1/2020 | Toyohira | B60G 17/0165 |
| 2020/0023705 A1 | 1/2020 | Hirao et al. | |
| 2020/0324609 A1* | 10/2020 | Bärecke | B60G 17/08 |
| 2021/0252935 A1* | 8/2021 | Belter | F16F 9/065 |
| 2021/0270341 A1* | 9/2021 | Lamoureux | F16F 9/3405 |

FOREIGN PATENT DOCUMENTS

| | | |
|---|---|---|
| JP | 4-11511 | 1/1992 |
| JP | 6-143961 | 5/1994 |
| JP | 2015-58914 | 3/2015 |
| WO | 2018/155541 | 8/2018 |

OTHER PUBLICATIONS

International Search Report issued Nov. 5, 2019 in International Application No. PCT/JP2019/036498, with English Translation, 5 pages.

Written Opinion of the International Searching Authority issued Nov. 5, 2019 in International Application No. PCT/JP2019/036498, with English Translation, 13 pages.

German Office Action issued on Feb. 24, 2022 in corresponding German Application No. 112019005068.0, with English translation, 8 pages.

* cited by examiner

VEHICLE SUSPENSION CONTROL DEVICE INCLUDING A DAMPING FORCE ADJUSTABLE SHOCK ABSORBER

TECHNICAL FIELD

The present invention relates to a suspension control device, which is to be mounted to a vehicle, for example, a motor vehicle, and is configured to absorb vibration of the vehicle.

BACKGROUND ART

In general, as a suspension control device mounted to a vehicle such as a motor vehicle, there is known a suspension control device configured such that a damping force adjustable shock absorber capable of adjusting a damping force is provided between a vehicle body and each wheel, and a damping force characteristic of the shock absorber is controlled based on a piston position and a piston speed, to thereby suppress a full extension and a full compression of a piston rod (see, for example, Patent Literature 1).

CITATION LIST

Patent Literature

PTL 1: JP H04-11511 A

SUMMARY OF INVENTION

Technical Problem

However, the related art of Patent Literature 1 cannot always effectively execute full extension suppression control in an extension stroke of the piston rod and full compression suppression control in a compression stroke. There is thus a problem of impact and noise to be reduced at the time of the full extension and the full compression of the piston rod.

Solution to Problem

The present invention has an object to provide a suspension control device capable of reducing impact and noise generated at the time of a full extension and a full compression of a piston rod, thereby being capable of increasing durability and extending a service life.

According to one embodiment of the present invention, there is provided a suspension control device including: a vehicle behavior calculation unit configured to detect or estimate a behavior of a vehicle; a damping force adjustable shock absorber provided between two members of the vehicle, the two members being movable relative to each other; and a controller configured to adjust a damping force of the damping force adjustable shock absorber based on a calculation result of the vehicle behavior calculation unit, wherein the damping force adjustable shock absorber includes: a cylinder which encloses working fluid; a piston which is inserted into the cylinder so as to be slidable; a piston rod, which is coupled to the piston, and extends to the outside of the cylinder; a full extension suppression mechanism configured to suppress impact in a full extension position range between a full extension control start position and a maximum full extension position of the piston; and a full compression suppression mechanism configured to suppress impact in a full compression position range between a full compression control start position and a maximum full compression position of the piston, wherein the controller is configured to: execute full extension suppression control of adjusting the damping force to be large when the piston reaches the full extension control start position and execute full compression suppression control of adjusting the damping force to be large when the piston reaches the full compression control start position; set a stroke from a neutral position of the piston in the cylinder to the full compression control start position so as to be longer than a stroke from the neutral position to the full extension control start position; and set a range from the full extension control start position to the full compression control start position to a dead zone in which none of the full extension suppression control and the full compression suppression control is executed.

According to one embodiment of the present invention, it is possible to reduce impact and noise generated at the time of the full extension and the full compression.

DESCRIPTION OF EMBODIMENTS

Figure 1:
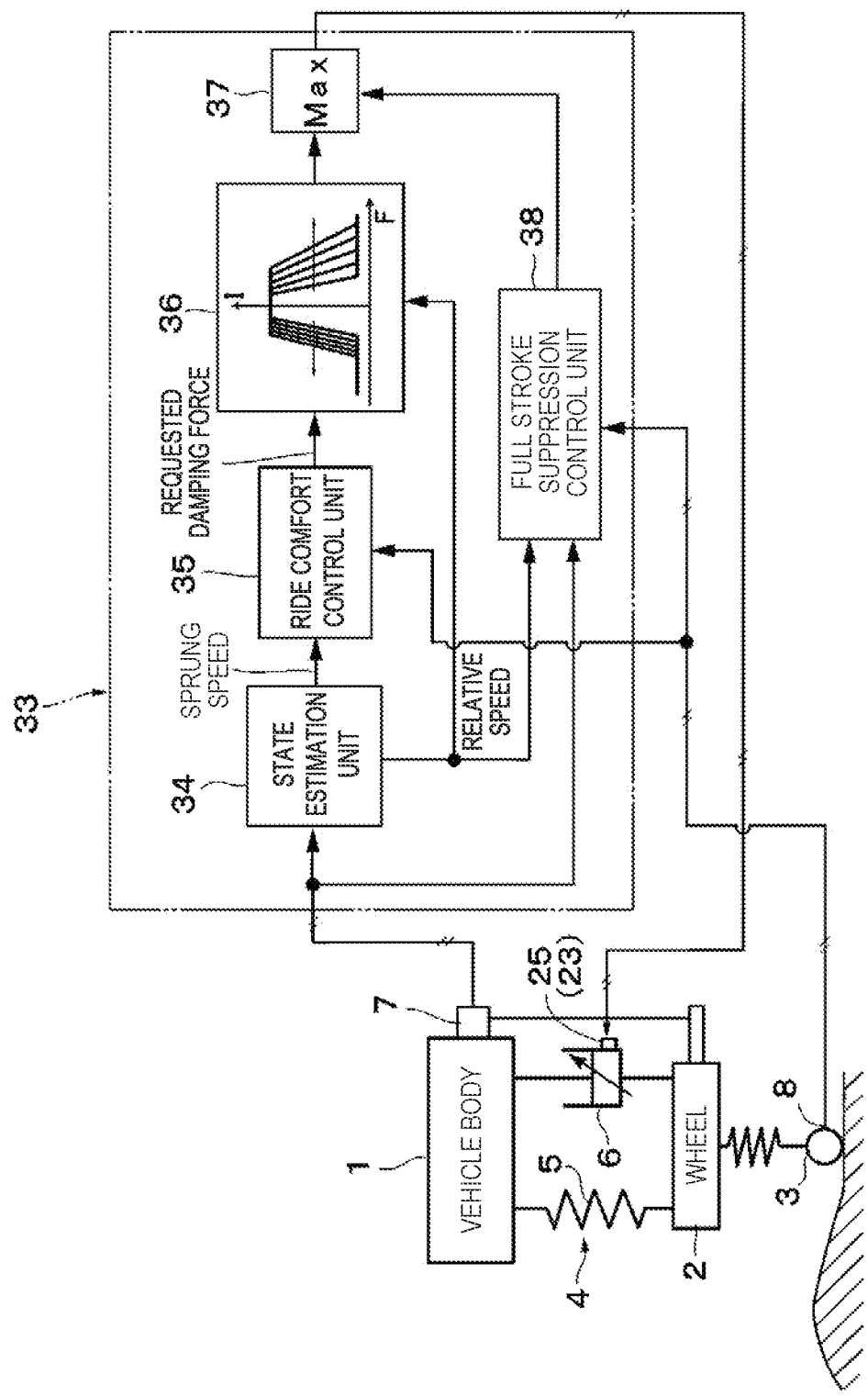
FIG. 1 is a control block diagram for illustrating an overall configuration of a suspension control device according to a first embodiment of the present invention.

A detailed description is now given of a suspension control device according to embodiments of the present invention with reference to accompanying drawings.

FIG. 1 to FIG. 5 show a first embodiment of the present invention. In the drawings, a vehicle body 1 forms a body of a vehicle (motor vehicle). On a bottom side of the vehicle body 1, there are provided wheels 2 (for example, including a left front wheel, a right front wheel, a left rear wheel, and a right rear wheel in the case of a four-wheeled vehicle). The wheel 2 includes a tire 3 acting as a spring configured to absorb, for example, fine roughness of a road surface.

A suspension device 4 is interposed between the vehicle body 1 and the wheel 2. The suspension device 4 is formed of a suspension spring 5 (hereinafter referred to as a spring 5) and a damping force adjustable shock absorber 6 (hereinafter referred to as a variable damper 6). The variable damper 6 is provided, in parallel with the spring 5, between the vehicle body 1 and the wheel 2. In FIG. 1, illustration is given of a case in which one set of the suspension device 4 is provided between the vehicle body 1 and the wheel 2. However, for example, four sets of suspension devices 4 in total are respectively and independently provided between the four wheels 2 and the vehicle body 1 in the case of the four-wheeled motor vehicle, and only one set among the four sets is schematically illustrated in FIG. 1.

Four vehicle height sensors 7 in total are provided for the vehicle body 1 on the side of the respective wheels 2 (the left front wheel, the right front wheel, the left rear wheel, and the right rear wheel). The vehicle height sensor 7 is a vehicle height detection device configured to individually detect, as a vehicle height on each wheel 2 side, a height of the vehicle body in accordance with extension or compression of the suspension device 4. The four vehicle height sensors 7 in total output detection signals of the respective vehicle heights to a controller 33 described below. The vehicle height sensors 7 are physical quantity extraction units, each of which is configured to detect or estimate physical quantities based on the relative displacement between the vehicle body 1 and each wheel 2 (that is, a force in the vertical direction and/or a vertical position), and forms a vehicle behavior calculation unit.

Moreover, vehicle speed sensors 8 also form the vehicle behavior calculation units configured to detect or estimate a behavior of the vehicle. The vehicle speed sensor 8 detects, for example, a rotation number of the wheel 2 (that is, the tire 3), and outputs the rotation number as vehicle speed (travel speed of the vehicle) information to the controller 33 described below. The vehicle behavior calculation unit includes a vehicle height/speed calculation unit (that is, the vehicle height sensors 7 and the vehicle speed sensors 8) configured to obtain the relative speed and the vehicle height between the two members being the vehicle body 1 and each wheel 2. Full extension suppression control and full compression suppression control executed by the controller 33 described below are configured to use calculated values of the vehicle height/speed calculation unit to obtain a change amount of a damping force. The sensor configured to detect the behavior of the vehicle (vehicle behavior calculation unit) is not limited to the vehicle height sensor, and may also be formed of an acceleration sensor, a gyro sensor, or the like.

Figure 2:
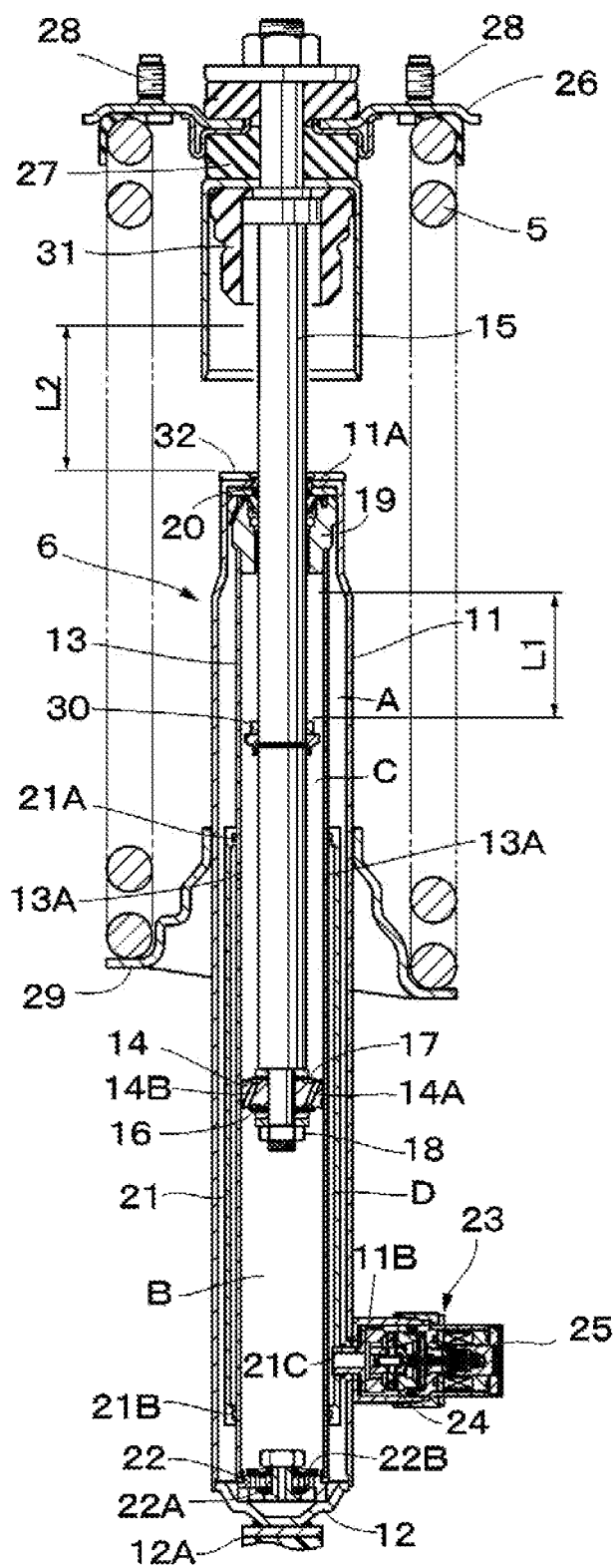
FIG. 2 is a longitudinal sectional view for illustrating a specific configuration of a suspension spring and a damping force adjustable shock absorber of FIG. 1.

With reference to FIG. 2, description is now given of the variable damper 6 of the suspension device 4. The variable damper 6 is a force generation mechanism configured to generate an adjustable force between the vehicle body 1 side and the wheel 2 side, and is formed of a hydraulic shock absorber of a damping force adjustable type.

In FIG. 2, the variable damper 6 formed of the hydraulic shock absorber of the damping force adjustable type includes, for example, an outer tube 11, an inner tube 13, a piston 14, a piston rod 15, a rod guide 19, a bottom valve 22, a damping force adjustment device 23, a rebound stopper 30 (full extension suppression mechanism), a bump rubber 31, and a bump rubber seat 32 (full compression suppression mechanism), which are described below. The generated damping force of the variable dumper 6 is variably adjusted by the damping force adjustment mechanism (damping force adjustment device 23) in accordance with a control command output from the controller 33.

The outer tube 11 having a bottomed tubular shape, which forms an outer shell of the variable damper 6, is closed by a bottom cap 12 on one end (bottom end) side through welding means or the like, and is formed into a caulking portion 11A bent radially inward on another end (top end) side. The outer tube 11 forms a cylinder together with the inner tube 13 described below. Meanwhile, an opening 11B is formed in the outer tube 11 on a bottom portion side at a position concentric with a connection opening 12C of an intermediate tube 21 described below. The damping force adjustment device 23 described below is mounted to a position opposed to the opening 11B. Moreover, on the bottom cap 12, there is provided a mounting eye 12A to be mounted to, for example, the wheel 2 side of the vehicle.

The inner tube 13 is provided on a radially inner side of the outer tube 11 so as to be coaxial with the outer tube 11. The inner tube 13 forms a cylinder together with the outer tube 11. A bottom end side of the inner tube 13 is fitted to be mounted to the bottom valve 22. A top end side is fitted to be mounted to the rod guide 19. Working liquid serving as working fluid is enclosed in the inner tube 13. An annular reservoir chamber A is formed between the outer tube 11 and the inner tube 13. Gas is enclosed together with the working liquid in the reservoir chamber A. Oil holes 13A in the radial direction are bored at predetermined intermediate positions in a lengthwise direction (axial direction) of the inner tube 13. A rod-side oil chamber C and an annular oil chamber D described below always communicate to each other through the oil holes 13A.

The piston 14 is inserted into and fitted to the inner tube 13 so as to be slidable. The piston 14 defines a chamber on one side (that is, a bottom-side oil chamber B) and a chamber on another side (that is, the rod-side oil chamber C) inside the inner tube 13. A plurality of oil passages 14A and a plurality of oil passages 14B for enabling communication between the bottom-side oil chamber B and the rod-side oil chamber C are formed in the piston 14 so as to be separated from one another in a circumferential direction. These oil passages 14A and 14B form passages configured to allow pressure oil to flow between the bottom-side oil chamber B and the rod-side oil chamber C in the inner tube 13.

A disc valve 16 on an extension side is provided on a bottom side (one side) surface of the piston 14. When the piston 14 displaces upward through sliding in an extension stroke of the piston rod 15, and a pressure in the rod-side oil chamber C exceeds a relief set pressure, the disc valve 16 on the extension side is opened, and a pressure on this occasion is relieved to the bottom-side oil chamber B side via respective oil passages 14A. This relief set pressure is set to a pressure higher than a valve opening pressure that is given when the damping force adjustment device 23 described later is set to hard.

A compression-side check valve 17 is provided on a top side (another side) surface of the piston 14. When the piston 14 displaces downward through sliding in a compression stroke of the piston rod 15, the compression-side check valve 17 is opened, and is closed otherwise. This check valve 17 is configured to allow the pressure oil in the bottom-side oil chamber B to flow through each of the oil passages 14B toward the rod-side oil chamber C, and block a flow of the pressure oil in an opposite direction. A valve opening pressure of the check valve 17 is set to a pressure lower than a valve opening pressure that is given when the damping force adjustment device 23 described later is set to soft, and a damping force is not substantially generated. A force that is given when the damping force is not substantially generated means that the force is equal to or less than frictions of the piston 14 and a seal member 20 and does not affect a motion of the vehicle.

A bottom end (one end) side of the piston rod 15 extending in the axial direction in the inner tube 13 is inserted to the inner tube 13 and is fixedly mounted to the piston 14 with a nut 18 or the like. Moreover, a top end (another end) side of the piston rod 15 extends (protrudes) to the outside of the outer tube 11 and the inner tube 13 via the rod guide 19.

The rod guide 19 having a stepped cylindrical shape is provided on a top end side of the inner tube 13. The rod guide 19 is configured to position a top end portion of the inner tube 13 at an inner side (center) of the outer tube 11, and guide the piston rod 15 so that the piston rod is slidable in the axial direction on an inner peripheral side of the rod guide 19. The annular seal member 20 is provided between the caulking portion 11A of the outer tube 11 and the rod guide 19. An inner peripheral side of the seal member 20 is in sliding contact with an outer peripheral side of the piston rod 15 to seal a gap to the piston rod 15, to thereby prevent the pressure oil in the outer tube 11 and the inner tube 13 from leaking to the outside.

The intermediate tube 21 is arranged between the outer tube 11 and the inner tube 13. The intermediate tube 21 is mounted, for example, on the outer peripheral side of the inner tube 13 through intermediation of a top seal ring 21A and a bottom seal ring 21B. The intermediate tube 21 surrounds the outer peripheral side of the inner tube 13 over the entire periphery, and is arranged while extending in the axial direction, to thereby form the annular oil chamber D in a gap to the inner tube 13. The annular oil chamber D is an oil chamber independent of the reservoir chamber A, and always communicates to the rod-side oil chamber C through the oil holes 13A in the radial direction formed in the inner tube 13. Moreover, a connection opening 21C to which a damping force adjustment valve 24 of the damping force adjustment device 23 described below is mounted is formed on a bottom end side of the intermediate tube 21.

The bottom valve 22 is located on a bottom end side of the inner tube 13, and is provided between the bottom cap 12 and the inner tube 13. As illustrated in FIG. 2, the bottom valve 22 defines the reservoir chamber A and the bottom-side oil chamber B between the bottom cap 12 and the inner tube 13. The bottom valve 22 includes a disk valve 22A on the compression side and a check valve 22B on the extension side.

When the piston 14 displaces downward through sliding in the compression stroke of the piston rod 15, and the pressure in the bottom-side oil chamber B exceeds a relief set pressure, the compression-side disk valve 22A is opened, and the pressure oil (pressure) on this occasion is relieved to the reservoir chamber A side. This relief set pressure is set to a valve opening pressure higher than a pressure that is given when the damping force adjustment device 23 described later is set to hard.

When the piston 14 displaces upward through sliding in the extension stroke of the piston rod 15, the extension-side check valve 22B is opened, and is closed otherwise. This extension-side check valve 22B is configured to allow the pressure oil (working liquid) in the reservoir chamber A to flow toward the bottom-side oil chamber B, and block a flow of the working liquid in an opposite direction. A valve opening pressure of the extension-side check valve 22B is set to a valve opening pressure lower than a pressure that is given when the damping force adjustment device 23 described later is set to soft, and a damping force is not substantially generated.

With reference to FIG. 2, description is now given of the damping force adjustment device 23 as the damping force adjustment mechanism configured to variably adjust the generated damping force of the variable damper 6.

A base end side (a left end side in FIG. 2) of the damping force adjustment device 23 is disposed so as to interpose between the reservoir chamber A and the annular oil chamber D, and a distal end side (a right end side of FIG. 2) is provided so as to protrude radially outward from the lower portion of the outer tube 11. The damping force adjustment device 23 is formed of the damping force adjustment valve 24 and a solenoid 25. The solenoid 25 serves as a damping force variable actuator configured to drive the damping force adjustment valve 24.

The damping force adjustment device 23 uses the damping force adjustment valve 24 to control the flow of the pressure oil flowing from the annular oil chamber D in the intermediate tube 21 to the reservoir chamber A, to thereby variably adjust a damping force generated on this occasion. That is, a valve opening pressure of the damping force adjustment valve 24 is adjusted by the solenoid 25, to thereby variably control the generated damping force. The solenoid 25 forms, together with the damping force adjustment valve 24, the damping force adjustment device 23, and is used as the damping force variable actuator.

As described above, the variable damper 6 is formed of the hydraulic shock absorber of the damping force adjustable type. The damping force adjustment device 23 formed of the damping force adjustment valve 24 and the solenoid 25 is attached to the variable damper 6 in order to continuously adjust a characteristic of the generated damping force (that is, a damping force characteristic) from a hard characteristic to a soft characteristic. It is not always required that the damping force adjustment device 23 be configured to continuously adjust the damping force characteristic, and the damping force adjustment device 23 may be configured to adjust the damping force at a plurality of levels, for example, two or more levels. Moreover, the variable damper 6 may be of a pressure control type or a flow rate control type.

The spring 5 constituting the suspension spring is arranged in a preset state between a mounting plate 26 being a vehicle-body-side mounting member and a spring seat 29 described below. The mounting plate 26 is fixed to and mounted to a protruding end side of the piston rod 15 through intermediation of a mount rubber 27 and the like. On the mounting plate 26, a plurality of mounting bolts 28 (only two thereof are illustrated) are provided at intervals in the circumferential direction. The mounting plate 26 is mounted to the vehicle body 1 side together with the piston rod 15 of the variable damper 6 by fastening each mounting bolt 28 to the vehicle body 1 side through use of a nut (not shown). Moreover, against a bottom surface side of the mounting plate 26, a top end side of the spring 5 is in abutment under an elastically deformed state.

A bottom end side of the spring 5 is supported by the spring seat 29 provided on an outer peripheral side of the outer tube 11. An inner peripheral side of the spring seat 29 is fixed to the outer peripheral side of the outer tube 11 by welding or the like. The spring 5 elastically deforms in accordance with a relative displacement (extension/compression operation of the variable damper 6) between the spring seat 29 on the outer tube 11 side and the mounting plate 26, to thereby always bias the piston rod 15 in the extension direction (protruding direction).

A rebound stopper 30 is located in the inner tube 13, and is provided so as to be fixed to the piston rod 15. The rebound stopper 30 forms a full extension suppression mechanism configured to prevent the piston 14 from colliding with a bottom surface of the rod guide 19 in the extension stroke of the piston rod 15. That is, the rebound stopper 30 forms the full extension suppression mechanism configured to suppress impact when the piston 14 is within a full extension position range.

The bump rubber 31 is located on a bottom side of the mount rubber 27, and is provided on the protruding end side of the piston rod 15. The bump rubber 31 is made of an elastic material such as rubber and is formed into a tubular shape. A bottom end (one end) side of the bump rubber 31 is a free end, and a top end (another end) side thereof is fixed to the protruding end side of the piston rod 15. The bump rubber seat 32 is provided so as to be fixed to the caulking portion 11A of the outer tube 11 from an outer side (top side). When the piston rod 15 displaces downward in the compression stroke, a bottom end side of the bump rubber 31 abuts against the bump rubber seat 32. On this occasion, the bump rubber 31 forms a full compression suppression mechanism configured to suppress, through elastic deformation, a further downward displacement of the piston rod 15. That is, the bump rubber 31 and the bump rubber seat 32 form the full compression suppression mechanism configured to suppress impact when the piston 14 is within a full compression position range.

In this configuration, a stroke of the piston 14, which displaces vertically through sliding in the inner tube 13, from a neutral position thereof to a full extension control start position can be represented by, for example, a dimension L1 of FIG. 2. A stroke from the neutral position to a full compression control start position can be represented by a dimension L2. Moreover, the neutral position of the piston 14 in the inner tube 13 is set such that the stroke (dimension L2) from the neutral position to the full compression control start position is longer than the stroke (dimension L1) to the full extension control start position. The neutral position changes in accordance with, for example, passengers and luggage, but can be obtained through calculation from vehicle height information and vehicle speed information.

The controller 33 is formed of a microcomputer and the like, and forms a control device configured to provide control of adjusting the damping characteristic of the variable damper 6. An input side of the controller 33 is connected to the vehicle height sensors 7 and the vehicle speed sensors 8, and also connected to a controller area network (CAN) through which various types of vehicle information represented by an acceleration and a steering angle of the vehicle is transmitted. Moreover, an output side of the controller 33 is connected to the damping force adjustment devices 23 (solenoids 25) of the variable dampers 6 and the like. The controller 33 obtains a force to be generated in the variable damper 6 of the suspension device 4, and outputs a command signal corresponding to the force to the damping force adjustment device 23 (solenoid 25) of the suspension device 4.

As illustrated in FIG. 1, the controller 33 includes a state estimation unit 34, a ride comfort control unit 35, a damping force command calculation unit 36, a maximum value selection unit 37, and a full stroke suppression control unit 38. The state estimation unit 34 estimates the state of the vehicle based on, for example, the signals from the vehicle height sensors 7.

The state estimation unit 34 of the controller 33 estimates a sprung speed of the vehicle body 1 based on information such as the vehicle heights (that is, the input information from the vehicle behavior calculation units). Moreover, the state estimation unit 34 obtains a relative speed (a displacement speed of the piston 14, that is, the piston speed of the variable damper 6) through calculation based on the information. That is, the state estimation unit 34 estimates and calculates the sprung speed and the relative speed as feedback road surface state values from the vehicle height information obtained by the vehicle height sensor 7. The vehicle height information also indicates the vertical displacement of the vehicle body 1. The sprung speed of the vehicle body 1 and the relative speed between the vehicle body 1 and the wheel 2 can be obtained by differentiating the vertical displacement.

The ride comfort control unit 35 of the controller 33 calculates a requested damping force to be generated by the variable damper 6 in order to execute ride comfort control (such as skyhook control or bilinear optimal control) based on the sprung speed estimated by the state estimation unit 34 and the information such as the vehicle speed (that is, the input information from the vehicle behavior calculation units). The damping force command calculation unit 36 executes map calculation based on the calculation result (requested damping force) of the ride comfort control unit 35 and the relative speed, to thereby calculate a command current in accordance with the damping characteristic.

The damping force command calculation unit 36 includes an F-I map, which variably sets a relationship between a target damping force F and a current value I in accordance with the relative speed as a characteristic map of FIG. 1. The damping force command calculation unit 36 calculates a command value as the command current to be output to the damping force adjustment device 23 (solenoid 25) of the variable damper 6 based on a signal (a signal corresponding to the requested damping force) output from the ride comfort control unit 35 and a signal (relative speed) output from the state estimation unit 34.

The maximum value selection unit 37 selects a command current having a larger current value of the command current output from the damping force command calculation unit 36 and a command current for full stroke suppression output from the full stroke suppression control unit 38 described below, and outputs the selected command current to the damping force adjustment device 23 (solenoid 25) of the variable damper 6.

Figure 3:
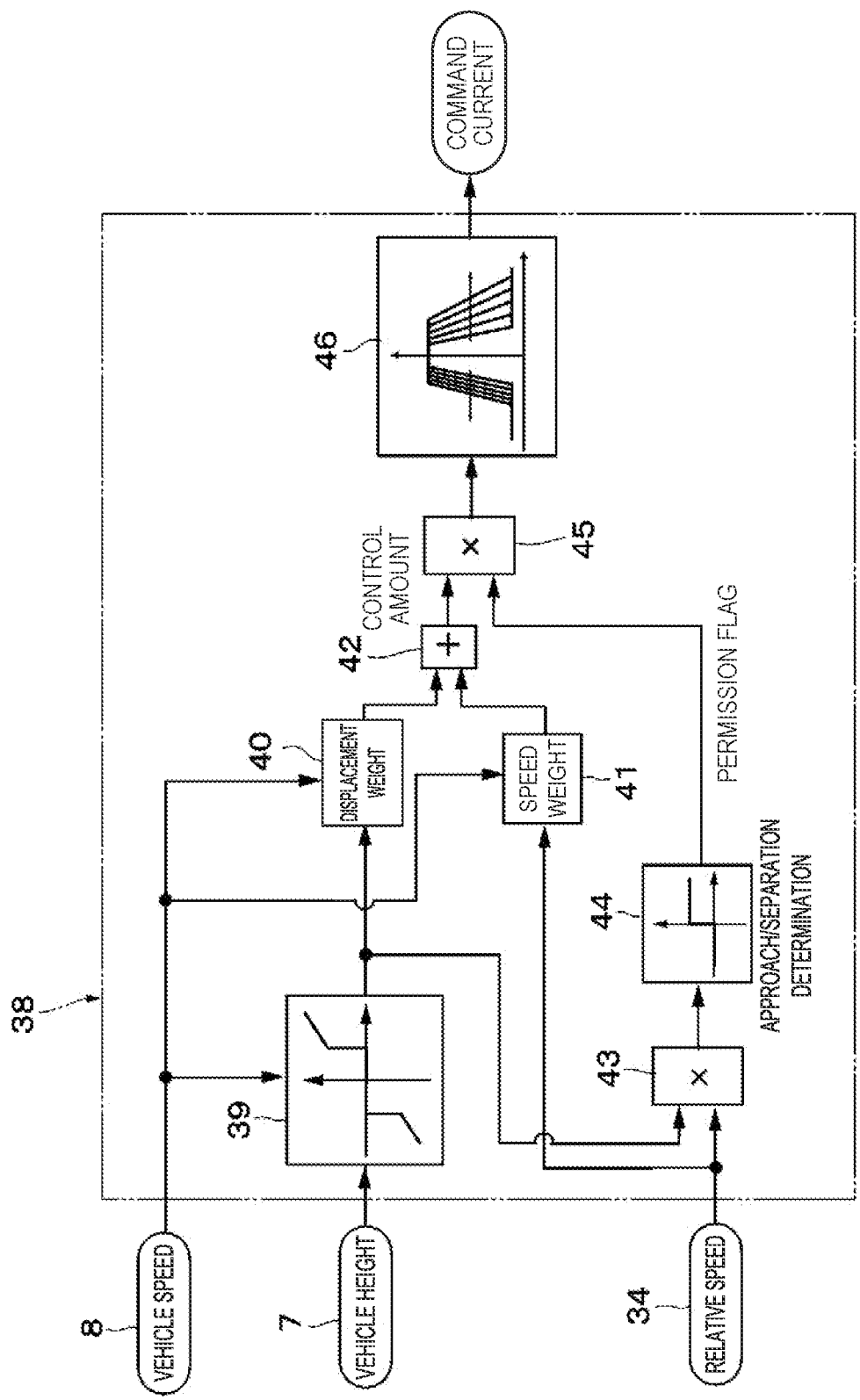
FIG. 3 is a control block diagram for specifically illustrating a full stroke suppression control unit of FIG. 1.
Figure 4:
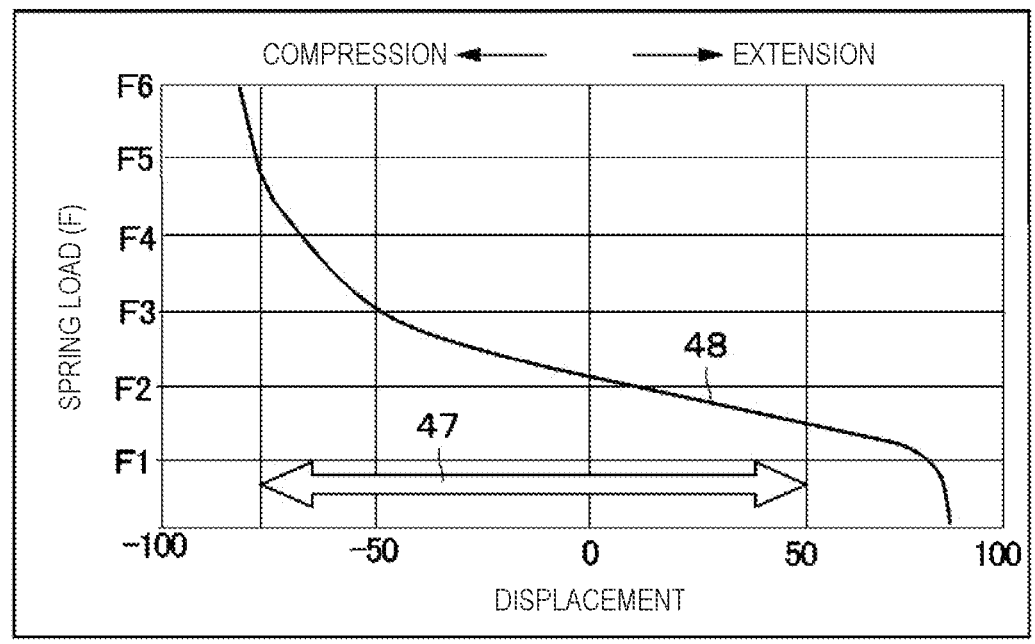
FIG. 4 is a characteristic graph for showing a relationship between a piston displacement in an inner tube and a spring load on the suspension spring.
Figure 5:
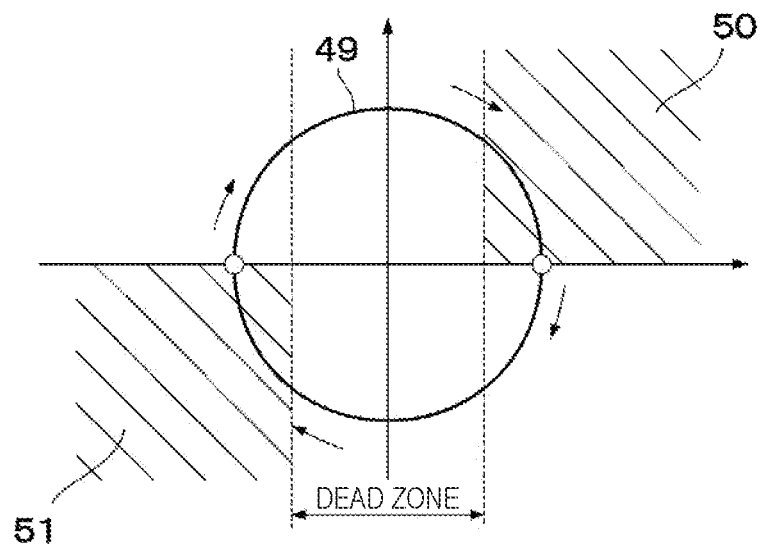
FIG. 5 is a characteristic view for illustrating a relationship between a relative displacement and a relative speed given when a vehicle height changes in a sine waveform during traveling on a road.

With reference to FIG. 3 to FIG. 5, description is now given of a specific configuration of the full stroke suppression control unit 38.

The full stroke suppression control unit 38 calculates the damping force control signal for executing the full stroke suppression control (that is, the full extension suppression control and the full compression suppression control) as the command current in accordance with the damping characteristic based on, for example, the vehicle height signal from the vehicle height sensor 7, the relative speed from the state estimation unit 34, and the vehicle speed signal from the vehicle speed sensor 8. The full stroke suppression control unit 38 includes a dead zone processing unit 39, a displacement weight calculation unit 40, a speed weight calculation unit 41, a control amount calculation unit 42, a first multiplication unit 43, an approach/separation determination unit 44, a second multiplication unit 45, and a command current calculation unit 46 for full stroke suppression.

The dead zone processing unit 39 of the full stroke suppression control unit 38 executes calculation processing for a dead zone range which is of the stroke range of the vertical displacement of the piston 14 through sliding in the inner tube 13, and in which the full extension suppression control and the full compression suppression control are not required to be executed. When the piston 14 is in the vicinity of the neutral position (that is, the vehicle height is zero) in the inner tube 13, the phenomenon such as the full extension or the full compression does not occur in the extension operation or the compression operation of the piston rod 15. Thus, an output value of the dead zone processing unit 39 is set to zero in the range 47 of the dead zone of FIG. 4.

A characteristic line 48 of FIG. 4 indicates a relationship between the displacement of the piston 14 in the inner tube 13 and a spring load F (spring force) of the spring 5 (suspension spring). A displacement of 0 on the horizontal axis corresponds to the case in which the piston 14 is at the neutral position (that is, zero of the vehicle height being a reference vehicle height). A value 100 of the displacement corresponds to a case (position) in which the piston 14 is displaced to a maximum position (that is, the maximum full extension position of the piston rod 15, which does not actually occur) toward the extension side. A value 50 of the displacement corresponds to a case in which the piston 14 is displaced by half (that is, 50%) toward the extension side. Moreover, a value −50 of the displacement corresponds to a case in which the piston 14 is displaced by half (that is, 50%) toward the compression side. A value −100 of the displacement corresponds to a case in which the piston 14 is displaced to a maximum position (that is, the maximum full compression position of the piston rod 15, which does not actually occur) toward the compression side.

As indicated by the characteristic line 48, the spring load F assigned to the vertical axis takes an intermediate value between a load F1 and a load F2 when the value of displacement is 50, and takes a value slightly larger than the load F2 when the displacement is 0. A position at which the spring load F sharply increases is set to a full extension control start position. Moreover, when the value of the displacement is −50, the spring load F takes a value approximately a load F3. Further, when the piston 14 is displaced beyond a value −80 toward the compression side, the spring load F sharply increases to a maximum load F6. A position at which the spring load F sharply increases is set to a full compression control start position. For example, when a non-linear spring (spring 5) called jounce bumper is mounted to the suspension, sound and impact are less liable to occur on the compression side of the spring 5. Thus, the range 47 of the dead zone is set to be wider on the compression side than on the extension side, to thereby be capable of delaying the start of unnecessary full compression suppression control.

When the spring characteristic (spring load F) of the spring 5 sharply changes as indicated by the characteristic line 48 of FIG. 4, the sound and the impact are liable to occur. Meanwhile, when the spring characteristic (spring load F) smoothly changes, it is known that the sound and the impact are relatively less liable to occur. Thus, the range 47 of the dead zone is set to be wider on the compression side of the displacement of the piston 14, and the range 47 of the dead zone is set to be narrower on the extension side.

Thus, the full stroke suppression control (that is, the full extension suppression control and the full compression suppression control) is not executed in the range 47 of the dead zone from the full extension position range (for example, the dimension L1) to the full compression position range (for example, the dimension L2). The full extension suppression control is executed when the extension-side displacement of the piston rod 15 increases beyond the range 47 of the dead zone. Meanwhile, the full compression suppression control is executed when the compression-side displacement of the piston rod 15 increases toward the compression side beyond the range 47 of the dead zone.

Further, the dead zone processing unit 39 can adjust the range 47 of the dead zone in accordance with the vehicle speed signals from the vehicle speed sensors 8. As a result, the full stroke suppression control (that is, the full extension suppression control and the full compression suppression control) can be executed only at a specific vehicle speed at which the full extension and/or the full compression of the piston rod 15 occurs.

After that, the displacement weight calculation unit 40 executes weighting through multiplying a coefficient by each of an output value (that is, an output value given when the displacement of the piston rod 15 on the extension side or the compression side increases beyond the range 47 of the dead zone) of the dead zone processing unit 39 and the vehicle speed information, to thereby calculate a displacement weight. Moreover, the speed weight calculation unit 41 executes weighting through multiplying a coefficient by each of the vehicle speed information and the relative speed output from the state estimation unit 34 (see FIG. 1), to thereby calculate a speed weight. After that, the control amount calculation unit 42 calculates the control command (control amount) in accordance with a value obtained by adding respective values as given by Expression (1) below.

$$\text{Control amount}=(\text{displacement weight}\times\text{vehicle height})+(\text{speed weight}\times\text{relative speed}) \quad (1)$$

The control amount calculation unit 42 changes the "displacement weight" and the "speed weight" of Expression (1), to thereby adjust a control timing and the control amount. In Table 1 given below, a relationship between the "weight balance" and the "control timing" calculated by the control amount calculation unit 42 are shown. In this case, when the control amount calculation unit 42 increases the "speed weight," a distribution to the relative speed increases, to thereby be capable of advancing the control timing. The control amount calculation unit 42 adjusts these weights, to thereby be capable of executing the control at an appropriate timing.

TABLE 1

| Weight Balance | Control Timing |
|---|---|
| Displacement weight: large, speed weight: small | Advanced |
| Displacement weight: small, speed weight: large | Retarded |

After that, the first multiplication unit 43 of the full stroke suppression control unit 38 calculates the relative displacement×the relative speed of each wheel, as an index that indicates a probability of the abutment against the stopper (that is, a probability of the occurrences of the full extension or the full compression of the piston rod 15). A circular trajectory 49 on X-Y coordinates of FIG. 5 indicates a relationship between the relative displacement and the relative speed, for example, when the vehicle height changes in a sine waveform.

When there is exemplified the case in which the piston 14 is displaced in a direction of arrows along the circular trajectory 49 (that is, the relationship between the relative displacement and the relative speed in the case in which the vehicle height changes in the sine waveform) on the X-Y coordinates of FIG. 5, the first quadrant corresponds to a case in which the piston 14 approaches the maximum stroke in the extension direction of the vehicle height. In this case, the piston 14 displaces in the extension direction of the vehicle height, the relative displacement is positive, and the piston speed (relative speed) is also positive (+). Thus, the relative displacement×the relative speed is a positive value.

The second quadrant corresponds to a case in which the piston 14 approaches the neutral position from the maximum stroke position on the compression side. In this case, the piston 14 displaces in the compression direction of the vehicle height, the relative displacement is negative (−), and the piston speed (relative speed) is positive (+). Thus, the relative displacement×the relative speed is a negative value in the second quadrant.

The third quadrant corresponds to a case in which the piston 14 approaches the maximum stroke in the compression direction of the vehicle height. In this case, the piston 14 displaces in the compression direction of the vehicle height, the relative displacement is negative, and the piston speed (relative speed) is also negative. Thus, the relative displacement×the relative speed is a positive value in the third quadrant.

The fourth quadrant corresponds to a case in which the piston 14 approaches the neutral position from the maximum stroke on the extension side. In this case, the piston 14 displaces in the extension direction of the vehicle height, the relative displacement is positive, and the piston speed (relative speed) is negative. Thus, the relative displacement×the relative speed is a negative value in the fourth quadrant.

Thus, the first multiplication unit 43 of the full stroke suppression control unit 38 multiplies the displacement (relative displacement) of the piston 14 output from the dead zone processing unit 39 and the relative speed output from the state estimation unit 34 (see FIG. 1) by each other, and outputs the multiplication result (that is, whether the product of the relative displacement×the relative speed is positive or negative) to the following approach/separation determination unit 44.

The approach/separation determination unit 44 can determine that the piston 14 approaches the full stroke (that is, the full extension position or the full compression position) based on the multiplication result of the first multiplication unit 43 when the product of the relative displacement×the relative speed is positive. That is, regions 50 and 51 of the first quadrant and the third quadrant of the X-Y coordinates of FIG. 5, which are indicated by hatchings, and exclude the dead zone respectively, correspond to a case in which the piston 14 approaches the full stroke, and control of increasing the damping force is executed to suppress the full stroke. Thus, the approach/separation determination unit 44 outputs a permission flag to the second multiplication unit 45. The permission flag is a permission flag for control of increasing the generated damping force for the full stroke suppression control by the command current calculation unit 46 described below, to thereby suppress the displacement of the piston rod 15.

Meanwhile, the approach/separation determination unit 44 can determine that the piston 14 is displaced in the direction away from the full stroke (that is, the full extension position or the full compression position) based on the multiplication result of the first multiplication unit 43 when the product of the relative displacement×the relative speed is negative. In this case, the approach/separation determination unit 44 stops the output of the permission flag to the second multiplication unit 45. In this case, the approach/separation determination unit 44 outputs a signal having an output value of 0 (zero) to the second multiplication unit 45. Thus, the outputs of the second multiplication unit 45 and the command current calculation unit 46 for the full stroke suppression are also zero, and the command current calculation unit 46 sets the value of the command current to zero.

After that, the second multiplication unit 45 multiplies the control amount calculated by the control amount calculation unit 42 and the permission flag output from the approach/separation determination unit 44 by each other, and outputs a value of the product to a damping force map of the command current calculation unit 46 for the full stroke suppression. When the permission flag output from the approach/separation determination unit 44 is the signal of the output value 0 (zero), the command current calculation unit 46 sets the value of the command current to zero. However, when the permission flag has the positive value, the command current for the full stroke suppression control based on the control amount calculated by the control amount calculation unit 42 is calculated by the command current calculation unit 46.

The maximum value selection unit 37 illustrated in FIG. 1 selects a command current having a larger current value of the command current output from the damping force command calculation unit 36 and a command current for full stroke suppression output from the command current calculation unit 46 of the full stroke suppression control unit 38, and outputs the selected command current to the damping force adjustment device 23 (solenoid 25) of the variable damper 6. As described above, the maximum value selection unit 37 selects the larger current value of the command current output from the full stroke suppression control unit 38 and the command current from the above-mentioned ride comfort control unit 35, and uses the selected current value as a final command, to thereby variably control the damping force of the variable damper 6.

The suspension control device according to the first embodiment has the above-mentioned configuration. Description is now given of a control operation thereof.

The state estimation unit 34 of the controller 33 estimates and calculates the sprung speed and the relative speed based on the vehicle height information of the vehicle height sensor 7. After that, the ride comfort control unit 35 calculates a requested damping force to be generated by the variable damper 6 in order to execute ride comfort control based on the sprung speed estimated by the state estimation unit 34 and the information such as the vehicle speed (that is, the input information from the vehicle behavior calculation units). Then, the damping force command calculation unit 36 executes map calculation based on the calculation result (requested damping force) of the ride comfort control unit 35 and the relative speed, to thereby calculate a command current in accordance with the damping characteristic.

Meanwhile, the full stroke suppression control unit 38 calculates the damping force control signal for executing the full stroke suppression control (that is, the full extension suppression control and the full compression suppression control) as the command current in accordance with the damping characteristic based on the vehicle height signal from the vehicle height sensor 7, the relative speed from the state estimation unit 34, and the vehicle speed signal from the vehicle speed sensor 8. In other words, the full extension suppression control and the full compression suppression control correct or calculate the control command in accordance with the product of the vehicle height and the relative speed.

The dead zone processing unit 39 of the full stroke suppression control unit 38 illustrated in FIG. 3 executes calculation processing for a dead zone range which is of the stroke range of the vertical displacement of the piston 14 through sliding in the inner tube 13, and in which the full extension suppression control and the full compression suppression control are not required to be executed. Thus, the full stroke suppression control unit 38 does not execute the full extension suppression control and the full compression suppression control in the range 47 of the dead zone from the full extension position range (for example, the dimension L1) to the full compression position range (for example, the dimension L2). The full extension suppression control is executed when the extension-side displacement of the piston rod 15 increases beyond the range 47 of the dead zone. Meanwhile, the full compression suppression control is executed when the compression-side displacement of the piston rod 15 increases toward the compression side beyond the range 47 of the dead zone.

After that, the displacement weight calculation unit 40 executes weighting with respect to the output value of the dead zone processing unit 39 and the vehicle speed information, to thereby calculate a displacement weight. Moreover, the speed weight calculation unit 41 executes weighting with respect to the vehicle speed information and the relative speed output from the state estimation unit 34, to thereby calculate a speed weight. Then, the control amount calculation unit 42 changes the "displacement weight" and the "speed weight" of Expression (1), to thereby adjust a control timing and the control amount.

The first multiplication unit 43 of the full stroke suppression control unit 38 multiplies the displacement (relative displacement) of the piston 14 output from the dead zone processing unit 39 and the relative speed output from the state estimation unit 34 by each other, and outputs the multiplication result (that is, whether the product of the relative displacement×the relative speed is positive or negative) to the following approach/separation determination unit 44. After that, the approach/separation determination unit 44 can determine whether the piston 14 approaches the full stroke (that is, the full extension position or the full compression position) or is displaced in the direction away from the full stroke based on the multiplication result of the first multiplication unit 43. When the piston 14 approaches the full stroke, the approach/separation determination unit 44 outputs the permission flag to the second multiplication unit 45 so that the command current calculation unit 46 increases the generated damping force for the full stroke suppression control, to thereby be capable of suppressing the displacement of the piston rod 15.

In this manner, the maximum value selection unit 37 of the controller 33 selects a command current having a larger current value of the command current output from the damping force command calculation unit 36 and a command current for full stroke suppression output from the command current calculation unit 46 of the full stroke suppression control unit 38, and outputs the selected command current to the damping force adjustment device 23 (solenoid 25) of the variable damper 6.

As a result, according to the first embodiment, when the rebound stopper 30 of the piston 14 displaces through sliding, in the inner tube 13, to a position close to the full extension position at which the rebound stopper 30 of the piston 14 abuts against the rod guide 19 or the full compression position at which the bump rubber 31 abuts against the bump rubber seat 32, the controller 33 executes the full extension suppression control or the full compression suppression control of adjusting the damping force to be large. The stroke (for example, the dimension L2) of the piston 14 in the inner tube 13 from the neutral position to the full compression control start position is set so as to be longer than the stroke (for example, the dimension L1) of the piston 14 from the neutral position to the full extension control start position. The portion between the full extension control start position and the full compression control start position is set to the dead zone in which none of the full extension suppression control and the full compression suppression control is executed.

As a result, the controller 33 executes the suspension control based on the vehicle height information (relative displacement and relative speed), to thereby be capable of estimating the full extension control start position or the full compression control start position of the piston 14 in the inner tube 13, and can consequently increase the damping force of the variable damper 6 so that the full extension suppression control or the full compression suppression control is executed at the appropriate control timing. The controller 33 uses not only the relative displacement but also the relative speed information to execute the control, to thereby be capable of executing the control at the timings appropriate for preventing the full extension or the full compression from occurring, and can consequently suppress the full extension and full compression of the piston 14 (piston rod 15). As a result, durability and a service life of the suspension device 4 including the variable damper 6 can be increased.

In this case, the controller 33 uses not only the relative displacement but also the relative speed information to execute the control, to thereby be capable of determining whether the piston 14 (piston rod 15) approaches or separates from the full extension state and the full compression state through use of, for example, the approach/separation determination unit 44 of the full stroke suppression control unit 38, and can consequently prevent unnecessary control, and can prevent deterioration of the ride comfort.

Moreover, the dead zone processing unit 39 of the full stroke suppression control unit 38 can set the dead zones on the extension side and the compression side independently for the extension and the compression in accordance with the suspension characteristic of the suspension device 4 (the spring 5 and the variable damper 6) mounted to the vehicle. As a result, the control can be prevented in the scene in which the stroke control is not required, to thereby be capable of preventing the ride comfort from deteriorating.

Figure 6:
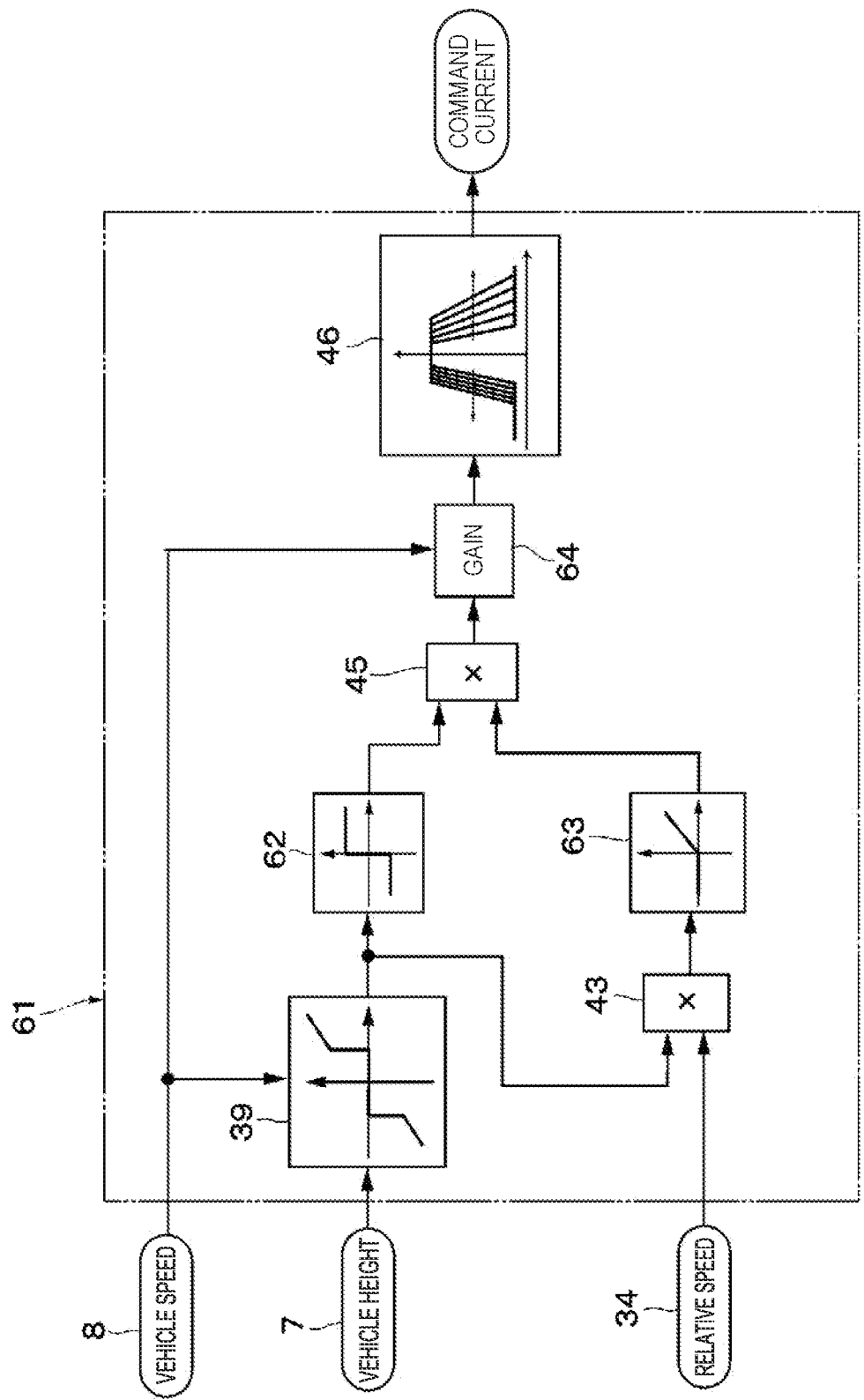
FIG. 6 is a control block diagram for specifically illustrating a full stroke suppression control unit according to a second embodiment of the present invention.
Figure 7:
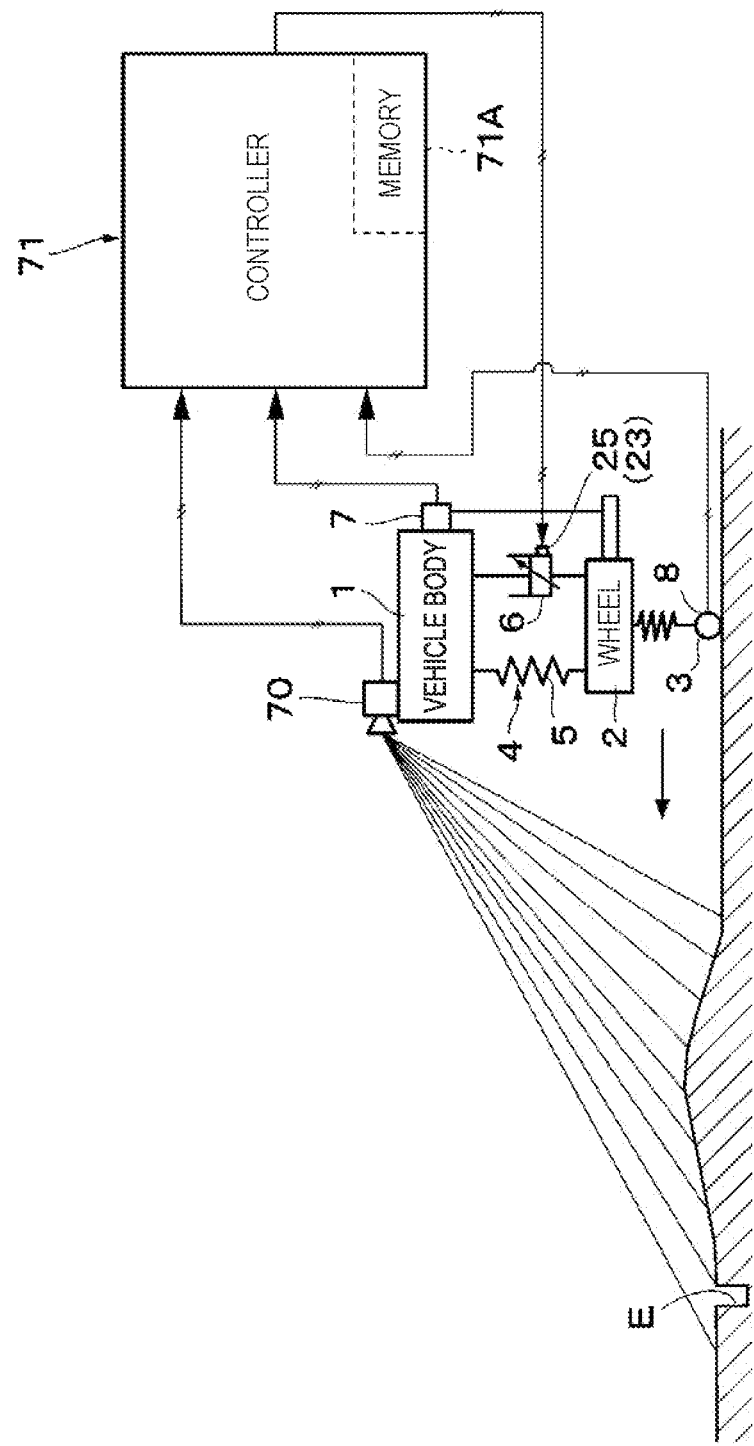
FIG. 7 is a control block diagram for illustrating an overall configuration of a suspension control device according to a third embodiment of the present invention.

FIG. 6 is a control block diagram for illustrating a second embodiment. In this embodiment, the same components as those in the first embodiment are denoted by the same reference symbols, and description thereof is omitted. However, a characteristic of the second embodiment is that a configuration of a full stroke suppression control unit 61 is different from the configuration of the full stroke suppression control unit 38 in the first embodiment.

The full stroke suppression control unit 61 employed in the second embodiment includes the dead zone processing unit 39, the first multiplication unit 43, the second multiplication unit 45, and the command current calculation unit 46 for the full stroke suppression similarly to the full stroke suppression control unit 38 in the first embodiment. However, the full stroke suppression control unit 61 in this embodiment includes a vehicle height state determination unit 62 between the dead zone processing unit 39 and the second multiplication unit 45, and includes an approach/separation determination unit 63 between the first multiplication unit 43 and the second multiplication unit 45.

The vehicle height state determination unit 62 determines, through use of map calculation, the state of the piston 14

(piston rod 15) based on the output value of the dead zone processing unit 39. The state of the piston 14 includes the state in which the piston 14 is in the dead zone range, the state in which the piston 14 approaches the full extension position, and the state in which the piston 14 approaches the full compression position. As a result, the vehicle height state determination unit 62 sets the output value to, for example, zero when the piston 14 is in the dead zone range, sets the output value to "+1" when the piston 14 approaches the full extension position, and sets the output value to "−1" when the piston 14 approaches the full compression position, and outputs the output value to the second multiplication unit 45.

Moreover, similarly to the approach/separation determination unit 44 in the first embodiment, the approach/separation determination unit 63 between the first multiplication unit 43 and the second multiplication unit 45 determines that the piston 14 approaches the full stroke (that is, the full extension position or the full compression position) when the product of the relative displacement×the relative speed is positive based on the multiplication result of the first multiplication unit 43. The approach/separation determination unit 63 determines that the piston 14 is displaced in the direction away from the full stroke position of the piston 14 when the product of the relative displacement×the relative speed is negative. After that, the approach/separation determination unit 63 outputs the signal of the output value 0 (zero) to the second multiplication unit 45 when the approach/separation determination unit 63 determines that the piston 14 is displaced in the direction away from the full stroke position.

However, the approach/separation determination unit 63 in this case calculates the output value so as to increase in proportion to the product of the relative displacement×the relative speed when the piston 14 approaches the full stroke position, and the product both thereof is thus positive. After that, the output value from the approach/separation determination unit 63 and the output value from the vehicle height state determination unit 62 are multiplied by each other by the second multiplication unit 45.

Further, the full stroke suppression control unit 61 in the second embodiment includes a gain multiplication unit 64 between the second multiplication unit 45 and the command current calculation unit 46 for the full stroke suppression. The gain multiplication unit 64 can change a gain in accordance with the vehicle speed such that the gain is high on a significantly rough road and a speed bump on which the vehicle speed is low, and the full extension or the full compression occurs.

As a result, also according to the second embodiment configured as described above, the full extension or the full compression does not occur at the neutral position of the piston 14 (in the vicinity of zero of the vehicle height), and the full stroke suppression control unit 61 applies the dead zone processing to the vicinity of zero of the vehicle height as in the first embodiment. Moreover, the full extension occurs when the vehicle height is high, and the relative speed corresponds to the extension, and the full compression occurs when the vehicle height is low, and the relative speed corresponds to the compression, and the full stroke suppression control unit 61 thus executes the full stroke suppression control when the product of the vehicle height and the relative speed is a value of plus (+).

Moreover, when the product is large, the vehicle height is close to a stroke end, and the speed of approaching the stroke end is also high, the full stroke suppression control unit 61 thus determines that a probability of the occurrence of the full extension or the full compression is high, multiplies the sign of the vehicle height so that the product of the vehicle height and the relative speed is always a positive value, and multiplies the gain by this value, to thereby obtain the requested damping force. Further, by changing the gain in accordance with the vehicle speed, the gain can be changed so that the gain can be high on the significantly rough road and the speed bump on which the vehicle speed is low and the full extension or the full compression occurs. The control command (command current) for the full stroke suppression is output in accordance with the requested damping force calculated as described above.

FIG. 7 to FIG. 10 are drawings for illustrating a third embodiment. A characteristic of this embodiment is that road surface preview information is obtained through use of, for example, digital cameras or laser sensors, and the weights are adjusted and the gain is set so as to be large in order to advance the timing of the full stroke suppression control when the full stroke is estimated in advance. In the third embodiment, the same components as those in the first embodiment are denoted by the same reference symbols, and description thereof is omitted.

A camera device 70 forms a road surface state detection unit (a road surface vertical displacement detection unit of the vehicle behavior calculation unit) mounted to a front portion of the vehicle body 1, and measures and detects a road surface state (specifically, the distance and the angle to the road surface to be detected and a position and a distance of a screen) forward of the vehicle. The camera device 70 includes, for example, a pair of right and left image pickup devices (digital cameras or the like), and is configured to take a pair of right and left images, to thereby be capable of detecting the road surface state including the distance and the angle to the object to be taken (the road surface located forward of the vehicle). Thus, the preview image forward of the vehicle (that is, information including a vertical displacement of the forward road surface) taken by the camera device 70 is output, as a detection result of the road surface state detection unit (road surface vertical displacement detection unit), to a controller 71 described below. The camera device 70 may be formed of, for example, a stereo camera, a millimeter wave radar+a monaural camera, or a plurality of millimeter wave radars.

The controller 71 is configured substantially similarly to the controller 33 in the first embodiment. However, the controller 71 uses a command value described below to variably control the damping force to be generated by the variable damper 6 based on a detection signal (image signal including the road surface information) output from the camera device 70 and the behavior information on the vehicle body 1 obtained from the vehicle height sensors 7 and the vehicle speed sensors 8. As a result, an input side of the controller 71 is connected to the vehicle height sensors 7, the vehicle speed sensors 8, the camera device 70, and the like, and an output side thereof is connected to the damping force adjustment devices 23 (solenoids 25) of the variable dampers 6 and the like. Moreover, the controller 71 includes, for example, a memory 71A formed of a ROM, a RAM, and/or a nonvolatile memory. In the memory 71A, there are stored a program for variably controlling the damping force to be generated in the variable damper 6, and further the road surface preview information taken by the camera device 70 and the like in an updatable manner.

Figure 8:
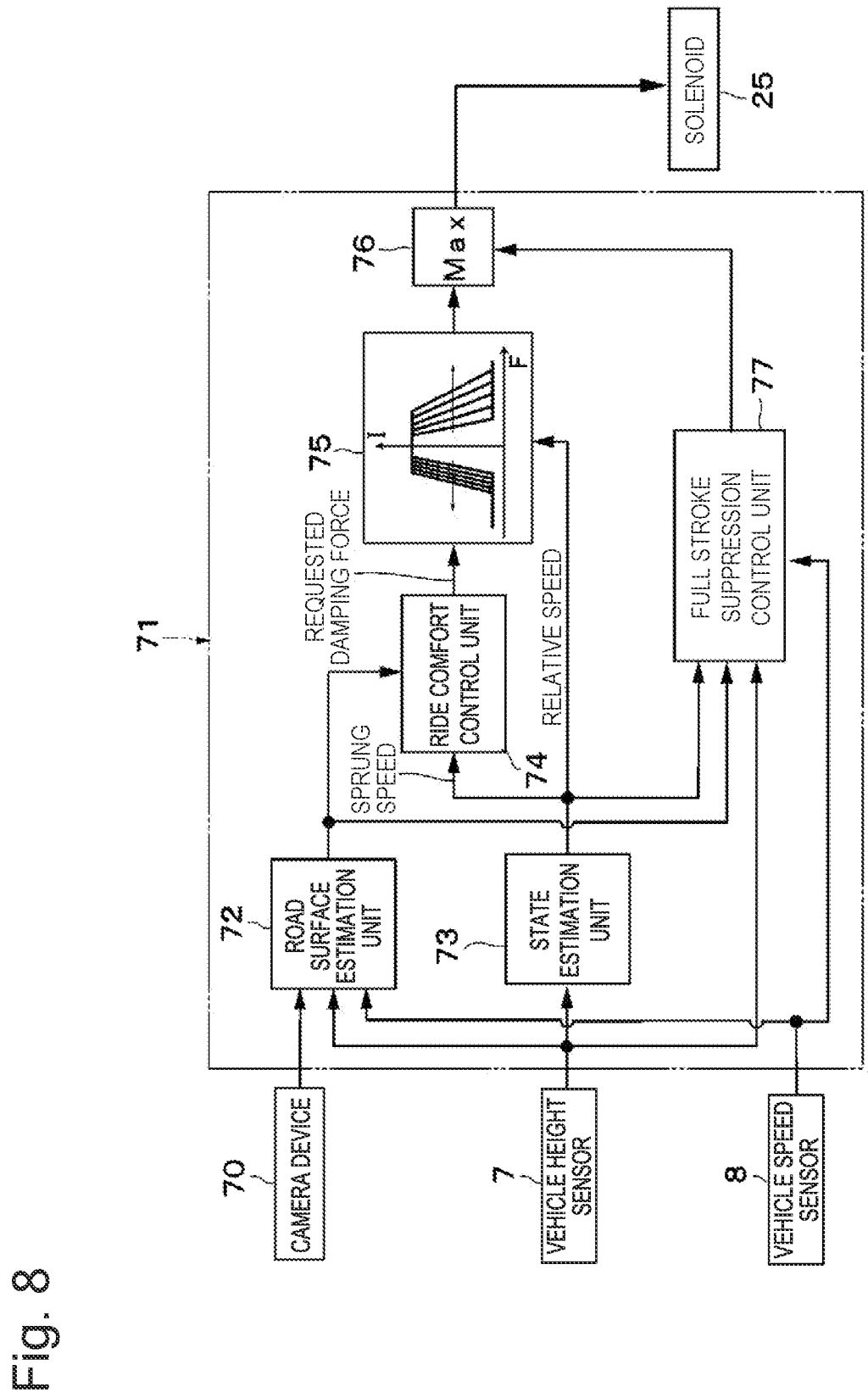
FIG. 8 is a control block diagram for specifically illustrating contents controlled by a controller of FIG. 7.

As illustrated in FIG. 8, the controller 71 includes a road surface estimation unit 72, a state estimation unit 73, a ride comfort control unit 74, a damping force command calculation unit 75, a maximum value selection unit 76, and a full stroke suppression control unit 77. Of these components, the state estimation unit 73 is configured similarly to the state estimation unit 34 in the first embodiment. The damping force command calculation unit 75 and the maximum value selection unit 76 are configured similarly to the damping force command calculation unit 36 and the maximum value selection unit 37 in the first embodiment, respectively.

The ride comfort control unit 74 is configured substantially similarly to the ride comfort control unit 35 in the first embodiment. However, the ride comfort control unit 74 in this case calculates a requested damping force to be generated by the variable damper 6 in order to execute the ride comfort control (such as skyhook control or bilinear optimal control) based on, in addition to the sprung speed estimated by the state estimation unit 73, the information output from the road surface estimation unit 72 (that is, the input information output from the vehicle behavior calculation unit).

That is, the ride comfort control unit 74 of FIG. 8 multiplies a gain (for example, a skyhook gain) calculated by a gain calculation unit 85 of the road surface estimation unit 72 by the sprung speed output from the state estimation unit 73, to thereby calculate the requested damping force as the force to be generated in the variable damper 6 (force generation mechanism) of the suspension device 4.

The damping force command calculation unit 75 includes an F-I map, which variably sets a relationship between the target damping force F and the current value I in accordance with the relative speed as a characteristic map of FIG. 8. The damping force command calculation unit 75 calculates a command value as the command current to be output to the damping force adjustment device 23 (solenoid 25) of the variable damper 6 based on a signal (a signal corresponding to the requested damping force) output from the ride comfort control unit 74 and a signal (relative speed) output from the state estimation unit 73.

The damping force command calculation unit 75 executes map calculation based on the calculation result (requested damping force) of the ride comfort control unit 74 and the relative speed, to thereby calculate a command current in accordance with the damping characteristic. The maximum value selection unit 76 selects a command current having a larger current value of the command current output from the damping force command calculation unit 75 and a command current for full stroke suppression output from the full stroke suppression control unit 77 described below, and outputs the selected command current to the damping force adjustment device 23 (solenoid 25) of the variable damper 6.

That is, the maximum value selection unit 76 selects the command value (command current) having the larger value of the command value calculated by the damping force command calculation unit 75 and the command value selected by a maximum value selection unit 96 of the full stroke suppression control unit 77, and outputs the selected command current to the damping force adjustment device 23 (solenoid 25) of the variable damper 6. As a result, the damping force characteristic of the variable damper 6 is variably controlled continuously or at a plurality of steps between the hard characteristic and the soft characteristic in accordance with the current (command value) supplied to the damping force adjustment device 23 (solenoid 25).

Figure 9:
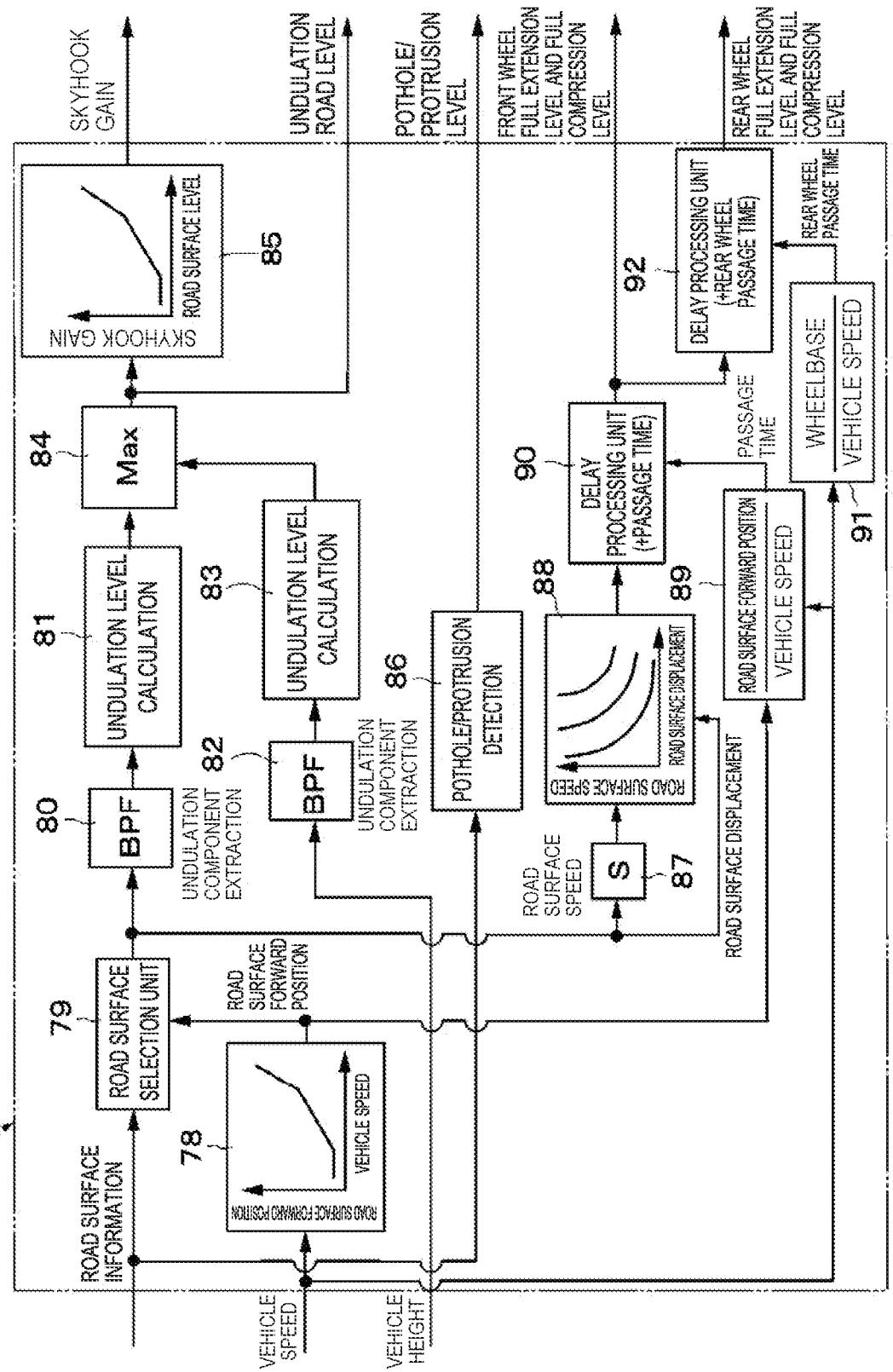
FIG. 9 is a control block diagram for specifically illustrating control by a road surface estimation unit of FIG. 8.

As illustrated in FIG. 9, the road surface estimation unit 72 employed in the third embodiment includes, for example, a forward position setting unit 78, a road surface selection unit 79, a first filter unit 80, a first undulation level calculation unit 81, a second filter unit 82, a second undulation level calculation unit 83, a maximum value calculation unit 84, the gain calculation unit 85, a pothole/protrusion detection unit 86, a speed calculation unit 87, a road surface level calculation unit 88, a passage time calculation unit 89, a delay processing unit 90, a rear wheel passage time calculation unit 91, and a delay processing unit 92. The forward position setting unit 78 sets a road surface forward position in accordance with the vehicle speed.

The forward position setting unit 78 of the road surface estimation unit 72 uses a setting map exemplified in the diagram of FIG. 9 to calculate the road surface forward position in accordance with the vehicle speed output from the vehicle speed sensors 8. The road surface selection unit 79 selectively takes in road surface information, which is of the road surface preview information (that is, preview images) on the forward portion of the vehicle taken by the camera device 70, and corresponds to the road surface forward position calculated by the forward position setting unit 78. That is, the road surface preview information taken by the camera device 70 includes many profiles of the road surface information extending over a range that is taken by cameras (or laser sensors), and can thus be previewed.

The road surface preview information on the forward portion of the vehicle taken by the camera device 70 includes the road surface profiles in the range that is estimated by the cameras (or the laser sensors), and can thus be previewed. The forward position setting unit 78 selects, in consideration of a delay of the system, a road surface at a position close to the vehicle when the vehicle speed is low, and a road surface at a far position when the vehicle speed is high. That is, the road surface selection unit 79 selects, in consideration of the delay of the control (system processing time) by the controller 71, road surface information on a relatively close position forward of the vehicle when the vehicle speed is low (for example, lower than 100 km/h), and selects road surface information on a relatively far position forward of the vehicle when the vehicle speed is high (for example, equal to or higher than 100 km/h). As a result, the controller 71 can reduce the capacity of the memory 71A.

After that, the first filter unit 80 executes band-pass filter (BPF) processing of extracting an undulation component in a predetermined frequency band from the profiles of the road surface information selected by the road surface selection unit 79. The first undulation level calculation unit 81 calculates an undulation level (that is, a feed forward road surface state value) of the road surface from the road surface information on the undulation component extracted by the first filter unit 80. The forward position setting unit 78, the road surface selection unit 79, the first filter unit 80, and the first undulation level calculation unit 81 of the road surface estimation unit 72 form, together with the camera device 70, the road surface state detection unit configured to detect the road surface state forward of the vehicle as the feed forward road surface state value.

Meanwhile, the second filter unit 82 executes BPF processing of extracting an undulation component in a predetermined frequency band from the vehicle height information (detection signal) output from the vehicle height sensors 7. The second undulation level calculation unit 83 calculates an undulation level (that is, a feedback road surface state value) of the road surface from the road surface information on the undulation component extracted by the second filter unit 82. The second filter unit 82 and the second undulation level calculation unit 83 of the road surface estimation unit 72 form, together with the vehicle height sensors 7, a vehicle body behavior information calculation unit configured to calculate the behavior information of the vehicle body 1 as the feedback road surface state value.

After that, the maximum value calculation unit 84 compares the undulation level (that is, the feed forward road surface state value) of the road surface calculated by the first undulation level calculation unit 81 and the undulation level (that is, the feedback road surface state value) of the road surface calculated by the second undulation level calculation unit 83 with each other, and selects a state value having the higher undulation level as a road surface level. The gain calculation unit 85 uses a setting map exemplified in the diagram of FIG. 9 to calculate a skyhook gain as a gain based on the road surface level output from the maximum value calculation unit 84. The gain (for example, a skyhook gain Csky) calculated by the gain calculation unit 85 has a small value when the road surface level is low, and is gradually increased to a large value in accordance with an increase in the road surface level.

The pothole/protrusion detection unit 86 of the road surface estimation unit 72 detects whether or not a protruding and recessed portion E (see FIG. 7) exists on the road surface forward of the vehicle from the road surface preview information taken by the camera device 70. As the protruding and recessed portion E, a pothole as a recessed portion or a protrusion as a protruding portion existing on the road surface is assumed. The pothole refers to a hole that is, for example, bored on a road surface due to a partial detachment of asphalt of asphalt pavement, and has a depth of approximately 10 cm or deeper. The large protrusion refers to a protrusion, for example, protruding, as a protruding portion, from the road surface by approximately 10 cm or higher.

The speed calculation unit 87 of the road surface estimation unit 72 differentiates the road surface displacement (road surface profile) selected by the road surface selection unit 79, to thereby calculate the road surface speed. The following road surface level calculation unit 88 uses map calculation to calculate a full extension level and a full compression level from the above-mentioned road surface displacement and road surface speed. The passage time calculation unit 89 divides the road surface forward position by the vehicle speed, to thereby calculate, for example, a passage time of the front wheels of the vehicle. The delay processing unit 90 executes delay processing such that the damping force control by the full stroke suppression control unit 77 is executed at the timing of the actual front wheel passage.

Moreover, the rear wheel passage time calculation unit 91 divides the wheelbase by the vehicle speed, to thereby calculate, for example, a passage time of the rear wheels of the vehicle in consideration of a further delay of the rear wheels of the vehicle corresponding to the wheelbase with respect to the front wheels. After that, the delay processing unit 92 executes delay processing such that the damping force control by the full stroke suppression control unit 77 is executed at the timing of the actual rear wheel passage.

Figure 10:
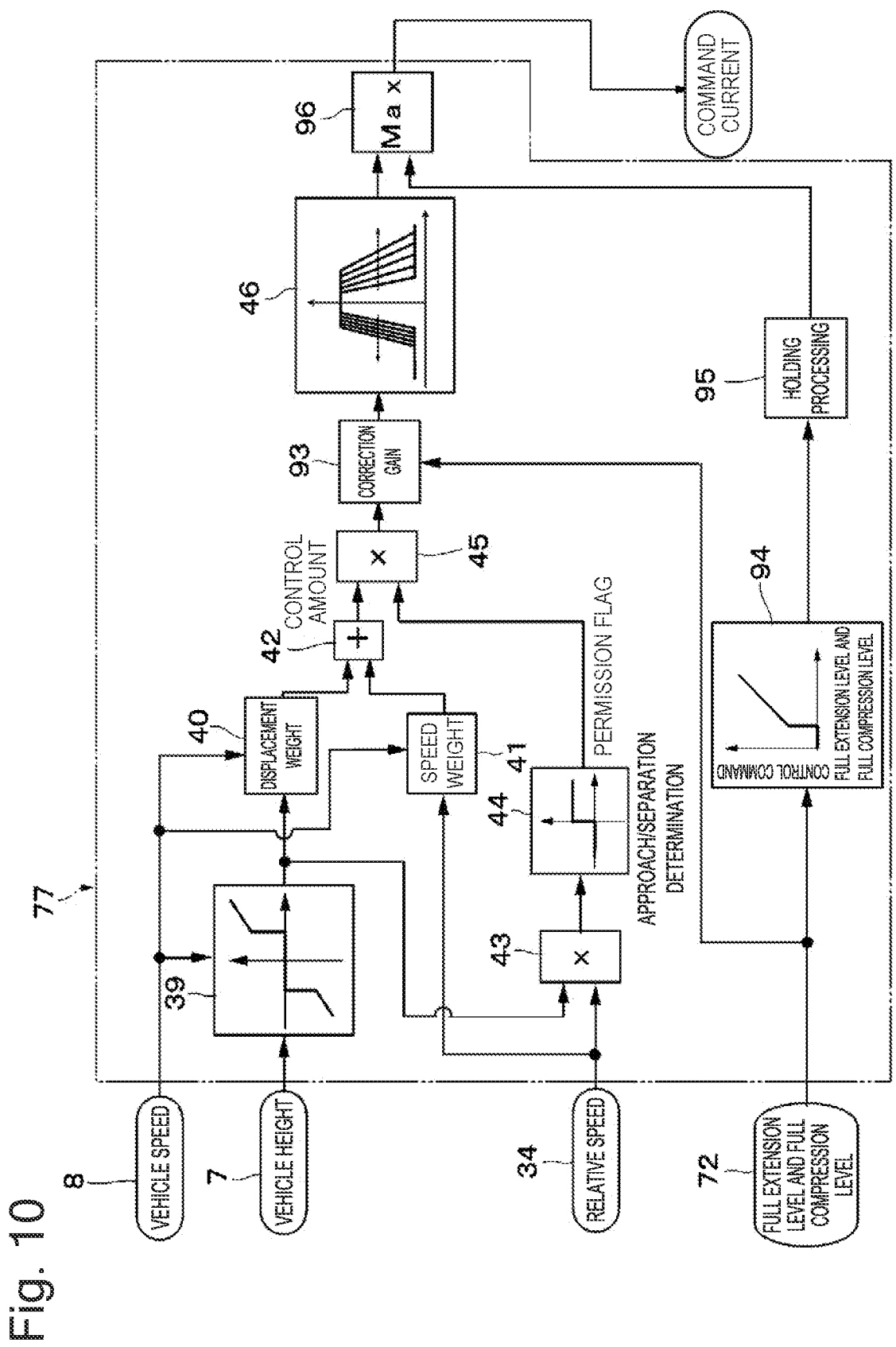
FIG. 10 is a control block diagram for specifically illustrating the full stroke suppression control unit of FIG. 8.

With reference to FIG. 10, description is now given of a specific configuration of the full stroke suppression control unit 77 employed in the third embodiment.

The full stroke suppression control unit 77, similarly to the full stroke suppression control unit 38 described in the first embodiment, includes the dead zone processing unit 39, the displacement weight calculation unit 40, the speed weight calculation unit 41, the control amount calculation unit 42, the first multiplication unit 43, the approach/separation determination unit 44, the second multiplication unit 45, and the command current calculation unit 46 for the full stroke suppression. However, in the full stroke suppression control unit 77 in this embodiment, a correction gain setting unit 93 is provided between the second multiplication unit 45 and the command current calculation unit 46, and a control command calculation unit 94, a holding processing unit 95, and a maximum value selection unit 96 are additionally provided.

The correction gain setting unit 93 sets a correction gain based on a front wheel full extension level and a front wheel full compression level and a rear wheel full extension level and a rear wheel full compression level output from the road surface level calculation unit 88 of the road surface estimation unit 72 through the delay processing units 90 and 92. That is, the correction gain setting unit 93 sets the correction gain so as to be large in order to increase the control amount of the generated damping force, to thereby increase an effect of the full extension suppression control or the full compression suppression control applied to the piston 14 (piston rod 15) when the full extension or the full compression is estimated based on the road surface preview information (detection value output from the road surface vertical displacement detection unit) output from the camera device 70.

When each of the above-mentioned front wheel full extension level, front wheel full compression level, rear wheel full extension level, and rear wheel full compression level is a certain value or larger, and is thus large, the control command calculation unit 94 calculates so as to increase the control command for the damping force. That is, when the control command calculation unit 94 and the holding processing unit 95 determine that the full extension or the full compression of the piston 14 cannot be prevented only by the control based on the vehicle height and the relative speed, the control command calculation unit 94 and the holding processing unit 95 determine the control amount based on the above-mentioned full extension level or full compression level, to thereby hold the control amount for a certain period through holding processing.

The maximum value selection unit 96 outputs, as the command current output by the full stroke suppression control unit 77, the larger output value of the output values of the command current calculation unit 46 and the holding processing unit 95. As a result, the damping force can be increased for the certain period to generally reduce the stroke itself, to thereby be capable of preventing the full extension or the full compression of the piston 14 as much as possible.

As a result, in the third embodiment configured as described above, the camera device 70 is used to obtain the road surface preview information, and, for example, the weights are adjusted and the gain is set so as to be large by the correction gain setting unit 93 in order to advance the timing of the full stroke suppression control when the full stroke is estimated in advance. Further, even when it is estimated that there occurs such large input that the damping force is insufficient, and the full extension or the full compression cannot be prevented by full stroke suppression control in accordance with the road surface displacement and the road surface speed, the full stroke suppression control unit 77, for example, increases the damping force calculated by the control command calculation unit 94 independently of the vehicle height and the relative speed, to thereby be capable of preventing the full extension or the full compression of the piston 14.

Figure 11:
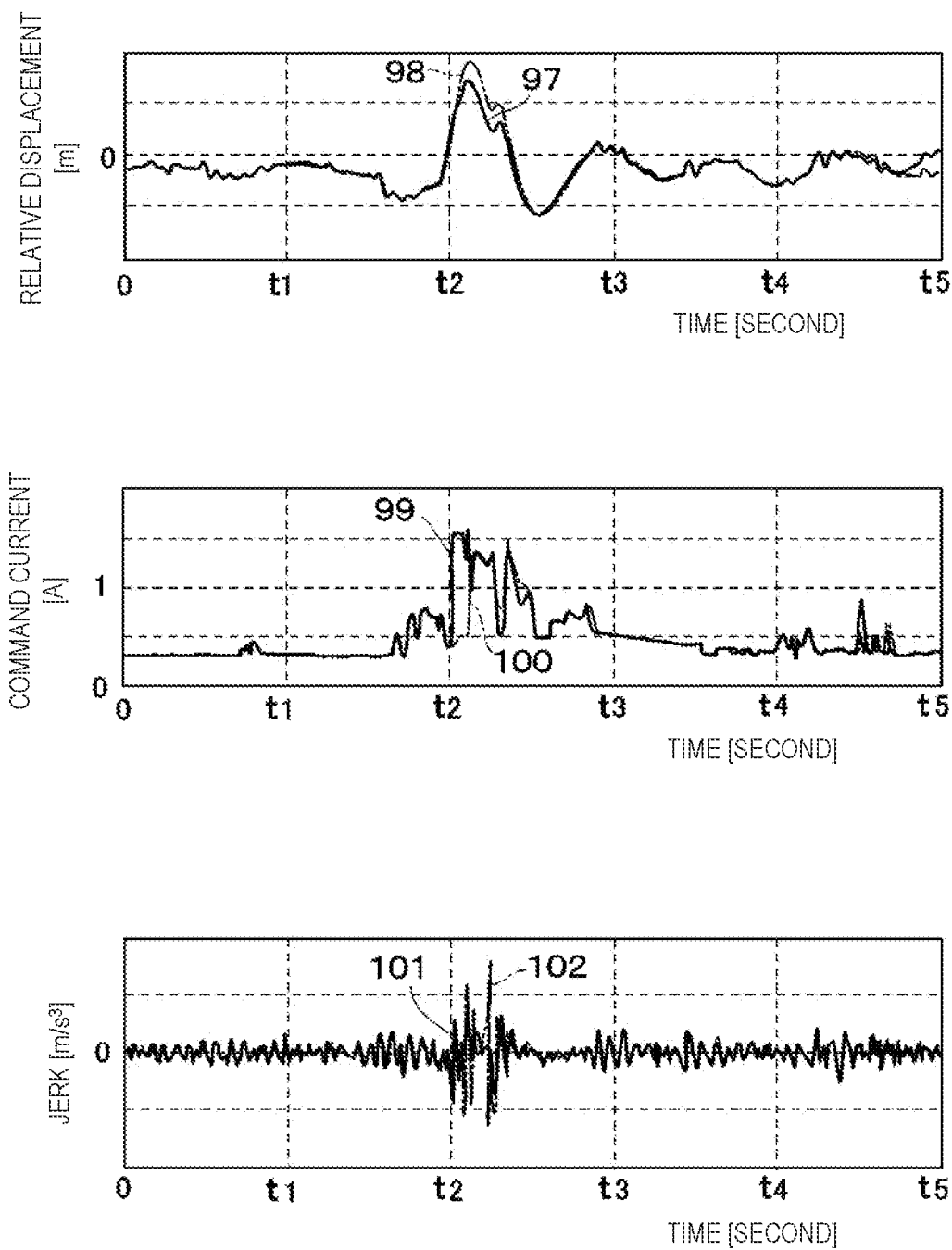
FIG. 11 is a characteristic graph for showing a relative displacement, a command current, and a vertical jerk on a right front wheel side as time charts.

FIG. 11 is a characteristic graph for showing a result of an experiment in a case in which the suspension control device according to this embodiment was applied to an actual vehicle. A characteristic line 97 indicated by a solid line of FIG. 11 indicates, as a time chart, the relative displacement between the vehicle body 1 and the wheel 2 (right front wheel) in this embodiment. Meanwhile, a characteristic line 98 indicated by a two-dot chain line of FIG. 11 indicates, as the same time chart, the relative displacement in the actual vehicle to which a suspension control device in the related art is mounted.

A characteristic line 99 indicated by a solid line of FIG. 11 indicates, as a time chart, a characteristic of the command current in this embodiment. Meanwhile, a characteristic line 100 indicated by a two-dot chain line indicates, as a time chart, a characteristic of the command current in the related art. Moreover, a characteristic line 101 indicated by a solid line indicates, as a time chart, a characteristic of a jerk (vertical direction) on the right front wheel side in this embodiment. Meanwhile, a characteristic line 102 indicated by a two-dot chain line indicates, as a time chart, a characteristic of the jerk on the right front wheel side in the related art.

In this embodiment, for example, the command current (characteristic line 99) is increased at a time t2 of FIG. 11, to thereby be capable of reducing the acceleration and the jerk generated in the vehicle body 1 before the occurrence of the full extension of the piston 14 (piston rod 15) as indicated by the characteristic line 101. It is also appreciated from the relative displacement indicated by the characteristic line 97 that the extension stroke can be suppressed. From these facts, an effect of suppressing the full extension and the full compression of the piston 14 (piston rod 15) is confirmed. Results similar to the characteristics of the characteristic lines 97, 99, and 101 of FIG. 11 were obtained also in the first embodiment and the second embodiment.

In the first embodiment, description is given with the example case in which the sprung speed and the relative speed of the vehicle body 1 are calculated by the state estimation unit 34 based on the detection signal output from the vehicle height sensor 7. However, the present invention is not limited to this case. For example, an acceleration sensor for the vertical direction or an angular velocity sensor may be used to detect vibration of the vehicle body 1, to thereby calculate the sprung speed. Moreover, the relative speed may be calculated by providing acceleration sensors for the sprung portion on the vehicle body 1 side and an unsprung portion, calculating a relative acceleration, and integrating the relative acceleration. Further, a wheel speed sensor, a longitudinal G sensor, a lateral G sensor, and the like may be used to estimate vertical motions of the vehicle body 1 and the wheel 2.

Moreover, the second embodiment and the third embodiment may be modified as in the first embodiment described above. Further, in each embodiment, description is given of the example in which the damping force adjustable shock absorber is formed of the variable damper 6 of the damping force adjustable type formed of a semi-active damper. However, the present invention is not limited to this case, and, for example, an active damper (any one of an electric actuator and a hydraulic actuator) or an air suspension may be used to form the damping force adjustable shock absorber.

Moreover, in the first embodiment to the third embodiment, the full stroke suppression control units 38, 61, and 77 may determine, from the vehicle height sensor value, the case in which the damping force is insufficient even when full stroke suppression control is executed in accordance with the road surface displacement and the road surface speed, and the full extension or the full compression thus occurs, and may increase the damping force for each rear wheel independently of the vehicle height and the relative speed, to thereby prevent the full extension or the full compression of the piston 14 when the full extension or the full compression is detected.

As the suspension control device according to the embodiments described above, for example, devices in the following forms are conceivable.

As a first aspect, a suspension control device includes: a vehicle behavior calculation unit configured to detect or estimate a behavior of a vehicle; a damping force adjustable shock absorber provided between two members of the vehicle, the two members being movable relative to each other; and a controller configured to adjust a damping force of the damping force adjustable shock absorber based on a calculation result of the vehicle behavior calculation unit, wherein the damping force adjustable shock absorber includes: a cylinder which encloses working fluid; a piston which is inserted into the cylinder so as to be slidable; a piston rod, which is coupled to the piston, and extends to the outside of the cylinder; a full extension suppression mechanism configured to suppress impact in a full extension position range between a full extension control start position and a maximum full extension position of the piston; and a full compression suppression mechanism configured to suppress impact in a full compression position range between a full compression control start position and a maximum full compression position of the piston, wherein the controller is configured to: execute full extension suppression control of adjusting the damping force to be large when the piston reaches the full extension control start position and execute full compression suppression control of adjusting the damping force to be large when the piston reaches the full compression control start position; set a stroke from a neutral position of the piston in the cylinder to the full compression control start position so as to be longer than a stroke from the neutral position to the full extension control start position; and set a range from the full extension control start position to the full compression control start position to a dead zone in which none of the full extension suppression control and the full compression suppression control is executed.

As a second aspect, in the first aspect, the vehicle behavior calculation unit includes a vehicle height/speed calculation unit configured to obtain a relative speed between the two members and a vehicle height, and the controller is configured to obtain a change amount of the damping force from calculated values of the vehicle height/speed calculation unit. As a third aspect, in the first aspect, the controller is configured to correct a control command in accordance with a product of the vehicle height and the relative speed. As a fourth aspect, in the first aspect, the controller is configured to calculate a control command in accordance with a product of the vehicle height and the relative speed.

As a fifth aspect, in the first aspect, the controller is configured to calculate a control command in accordance with a sum of a product of the vehicle height and a coefficient and a product of the relative speed and a coefficient. As a sixth aspect, in the first aspect, the vehicle behavior calculation unit includes a road surface vertical displacement detection unit configured to detect a vertical displacement of a forward road surface, and the controller is configured to calculate a control command in accordance with a detection value of the road surface vertical displacement detection unit when it is estimated, in accordance with a detection value of the road surface vertical displacement detection unit, that a full extension or a full compression occurs.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-193609 filed on Oct. 12, 2018. All disclosed contents including Specification, Scope of Claims, Drawings, and Abstract of Japanese Patent Application No. 2018-193609 filed on Oct. 12, 2018 are incorporated herein by reference in their entirety.

REFERENCE SIGNS LIST 1 vehicle body, 2 wheel, 4 suspension device, 5 spring (suspension spring), 6 variable damper (damping force adjustable shock absorber), 7 height sensor (vehicle behavior calculation unit), 8 vehicle speed sensor (vehicle behavior calculation unit), 11 outer tube (cylinder), 13 inner tube (cylinder), 14 piston, 15 piston rod, 23 damping force adjustment device, 25 solenoid, 30 rebound stopper (full compression suppression mechanism), 31 bump rubber (full compression suppression mechanism), 32 bump rubber seat (full compression suppression mechanism), 33, 71 controller, 34, 73 state estimation unit, 47 range of the dead zone, 70 camera device (road surface vertical displacement detection unit), L1 stroke from the neutral position to the full extension control start position, L2 stroke from the neutral position to the full compression control start position

The invention claimed is:

1. A suspension control device, comprising:
a damping force adjustable shock absorber provided between two members of the vehicle, the two members being movable relative to each other;
a non-linear spring disposed in parallel with the damping force adjustable shock absorber and provided between two members of the vehicle, the two members being movable relative to each other; and
a controller configured to adjust a damping force of the damping force adjustable shock absorber,
wherein the damping force adjustable shock absorber includes:
a cylinder which encloses working fluid;
a piston which is provided in the cylinder so as to be slidable;
a piston rod, which is fixed to the piston so as to extend to the outside of the cylinder; and
a damping force adjustment mechanism configured to adjust a damping force generated when the piston relatively slides in the cylinder; and
wherein the controller controls the damping force adjustment mechanism, the controller being configured to:
obtain a relative speed between the two members and a vehicle height using a vehicle height sensor and a vehicle speed sensor;
execute a full extension suppression control of adjusting the damping force to be larger than when the piston is in a neutral position, when a relative position between the cylinder and the piston approaches a full extension position in an extension stroke in which a distal end of the piston rod spaces apart from the cylinder, the relative position being input from the outside;
execute a full compression suppression control of adjusting the damping force to be larger than when the piston is in a neutral position, when the relative position between the cylinder and the piston approaches a full compression position in a compression stroke in which the distal end of the piston rod approaches the cylinder, the relative position being input from the outside;
set a stroke from a neutral position of the piston in the cylinder to a full compression control start position so as to be longer than a stroke from the neutral position to a full extension control start position; and
correct a control command in accordance with a product of the vehicle height and the relative speed between the two members.

2. A suspension control device, comprising:
a damping force adjustable shock absorber provided between two members of the vehicle, the two members being movable relative to each other;
a non-linear spring disposed in parallel with the damping force adjustable shock absorber and provided between two members of the vehicle, the two members being movable relative to each other; and
a controller configured to adjust a damping force of the damping force adjustable shock absorber,
wherein the damping force adjustable shock absorber includes:
a cylinder which encloses working fluid;
a piston which is inserted into the cylinder so as to be slidable;
a piston rod, which is coupled to the piston, and extends to the outside of the cylinder;
a rebound stopper configured to suppress impact in a full extension position range between a full extension control start position and a maximum full extension position of the piston; and
a bump rubber and a bump rubber seat configured to suppress impact in a full compression position range between a full compression control start position and a maximum full compression position of the piston,
wherein the controller is configured to:
obtain a relative speed between the two members and a vehicle height using a vehicle height sensor and a vehicle speed sensor;
execute full extension suppression control of adjusting the damping force to be larger than when the piston is in a neutral position, when the piston reaches the full extension control start position and execute full compression suppression control of adjusting the damping force to be larger than when the piston is in a neutral position, when the piston reaches the full compression control start position;
set a stroke from a neutral position of the piston in the cylinder to the full compression control start position so as to be longer than a stroke from the neutral position to the full extension control start position;
set a range from the full extension control start position to the full compression control start position to a dead zone in which none of the full extension suppression control and the full compression suppression control is executed; and correct a control command in accordance with a product of the vehicle height and the relative speed between the two members.

3. The suspension control device according to claim 2, wherein the controller is configured to obtain a change amount of the damping force from calculated values of the vehicle height sensor and the vehicle speed sensor.

4. The suspension control device according to claim 2, wherein the controller is configured to calculate a control command in accordance with a product of the vehicle height and the relative speed.

5. The suspension control device according to claim 2, wherein the controller is configured to calculate a control command in accordance with a detection value of a road surface vertical displacement detection unit, which detect a vertical displacement of a forward road surface, when it is estimated, in accordance with a detection value of the road surface vertical displacement detection unit, that a full extension or a full compression occurs.

6. A suspension control device, comprising:
a damping force adjustable shock absorber provided between two members of the vehicle, the two members being movable relative to each other;
a non-linear spring disposed in parallel with the damping force adjustable shock absorber and provided between two members of the vehicle, the two members being movable relative to each other; and
a controller configured to adjust a damping force of the damping force adjustable shock absorber,
wherein the damping force adjustable shock absorber includes:
a cylinder which encloses working fluid;
a piston which is provided in the cylinder so as to be slidable;
a piston rod, which is fixed to the piston so as to extend to the outside of the cylinder; and
a damping force adjustment mechanism configured to adjust a damping force generated when the piston relatively slides in the cylinder; and
wherein the controller controls the damping force adjustment mechanism, the controller being configured to:
obtain a relative speed between the two members and a vehicle height using a vehicle height sensor and a vehicle speed sensor;
execute a full extension suppression control of adjusting the damping force to be larger than when the piston is in a neutral position when a relative position between the cylinder and the piston approaches a full extension position in an extension stroke in which a distal end of the piston rod spaces apart from the cylinder, the relative position being input from the outside;
execute a full compression suppression control of adjusting the damping force to be larger than when the piston is in a neutral position when the relative position between the cylinder and the piston approaches a full compression position in a compression stroke in which the distal end of the piston rod approaches the cylinder, the relative position being input from the outside;
set a stroke from a neutral position of the piston in the cylinder to a full compression control start position so as to be longer than a stroke from the neutral position to a full extension control start position; and
calculate a control command in accordance with a sum of a product of the vehicle height and a coefficient and a product of the relative speed between the two members and a coefficient.

7. A suspension control device, comprising:
a damping force adjustable shock absorber provided between two members of the vehicle, the two members being movable relative to each other;
a non-linear spring disposed in parallel with the damping force adjustable shock absorber and provided between two members of the vehicle, the two members being movable relative to each other; and
a controller configured to adjust a damping force of the damping force adjustable shock absorber,
wherein the damping force adjustable shock absorber includes:
a cylinder which encloses working fluid;
a piston which is inserted into the cylinder so as to be slidable;
a piston rod, which is coupled to the piston, and extends to the outside of the cylinder;
a rebound stopper configured to suppress impact in a full extension position range between a full extension control start position and a maximum full extension position of the piston; and
a bump rubber and a bump rubber seat configured to suppress impact in a full compression position range between a full compression control start position and a maximum full compression position of the piston,
wherein the controller is configured to:
obtain a relative speed between the two members and a vehicle height using a vehicle height sensor and a vehicle speed sensor;
execute full extension suppression control of adjusting the damping force to be larger than when the piston is in a neutral position when the piston reaches the full extension control start position and execute full compression suppression control of adjusting the damping force to be larger than when the piston is in a neutral position when the piston reaches the full compression control start position;
set a stroke from a neutral position of the piston in the cylinder to the full compression control start position so as to be longer than a stroke from the neutral position to the full extension control start position;
set a range from the full extension control start position to the full compression control start position to a dead zone in which none of the full extension suppression control and the full compression suppression control is executed; and
calculate a control command in accordance with a sum of a product of the vehicle height and a coefficient and a product of the relative speed between the two members and a coefficient.

* * * * *